(12) United States Patent
Itagaki

(10) Patent No.: US 9,188,458 B2
(45) Date of Patent: Nov. 17, 2015

(54) POSITIONAL INFORMATION PROVIDING SYSTEM, NAVIGATION SYSTEM, AND TERMINAL DEVICE

(71) Applicant: Hitachi Maxell, Ltd., Osaka (JP)

(72) Inventor: Tsuguo Itagaki, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 64 days.

(21) Appl. No.: 13/870,428

(22) Filed: Apr. 25, 2013

(65) Prior Publication Data
US 2013/0289871 A1 Oct. 31, 2013

(30) Foreign Application Priority Data

Apr. 27, 2012 (JP) ................. 2012-102885

(51) Int. Cl.
G01C 21/00 (2006.01)
G01C 21/20 (2006.01)
G01C 21/36 (2006.01)
G01C 5/06 (2006.01)
(52) U.S. Cl.
CPC .............. *G01C 21/3676* (2013.01); *G01C 5/06* (2013.01); *G01C 21/00* (2013.01); *G01C 21/206* (2013.01)
(58) Field of Classification Search
CPC ...... G01C 21/3676; G01C 21/00; G01C 5/06; G01C 21/206
USPC ...................... 701/410, 454, 472; 702/98, 150
See application file for complete search history.

(56) References Cited

U.S. PATENT DOCUMENTS

| | | | | |
|---|---|---|---|---|
| 6,201,544 B1 * | 3/2001 | Ezaki | ............................. | 345/419 |
| 6,658,354 B2 * | 12/2003 | Lin | ................................ | 701/454 |
| 7,302,340 B2 * | 11/2007 | Preston | .......................... | 701/487 |
| 7,698,057 B2 * | 4/2010 | Kobayashi et al. | ........... | 701/463 |
| 8,666,158 B2 * | 3/2014 | Strassenburg-Kleciak | ... | 382/165 |
| 8,854,279 B2 * | 10/2014 | Miyamoto et al. | ............. | 345/2.1 |
| 2004/0203906 A1 * | 10/2004 | Kato et al. | ................. | 455/456.1 |
| 2005/0116858 A1 * | 6/2005 | Odamura | ................. | 342/357.09 |
| 2005/0272447 A1 * | 12/2005 | Eckel | .......................... | 455/456.6 |
| 2007/0168124 A1 * | 7/2007 | Dossas et al. | .................. | 701/213 |

(Continued)

FOREIGN PATENT DOCUMENTS

JP 2005-70115 3/2005
JP 2005-337872 A 12/2005
(Continued)

*Primary Examiner* — Calvin Cheung
*Assistant Examiner* — Angelina Shudy
(74) *Attorney, Agent, or Firm* — Baker Botts L.L.P.

(57) ABSTRACT

A positional information providing system is provided in which positional information including altitude can be highly accurately acquired even though a user is located outdoors or indoors. A system includes a server device including a map data storage unit, an altitude storage unit, a reference position coordinates receiving unit, a reference point altitude information generating unit locating reference position coordinates and reference point altitude, a map data transmitting unit and a reference point altitude information transmitting unit, and a terminal device including a positional information acquiring unit, a reference point information transmitting unit, a reference point altitude information receiving unit, a map data receiving unit and a reference point altitude detecting unit detecting altitude at a reference point. The terminal device includes a calibration unit for the altitude data acquired at the reference point altitude detecting unit and a map display unit displaying map data and altitude data.

18 Claims, 25 Drawing Sheets

(56) References Cited

U.S. PATENT DOCUMENTS

| | | | |
|---|---|---|---|
| 2007/0225910 A1* | 9/2007 | Fujiwara | 701/211 |
| 2007/0239355 A1* | 10/2007 | Oh et al. | 701/211 |
| 2010/0049469 A1* | 2/2010 | Wirola et al. | 702/150 |
| 2011/0106449 A1* | 5/2011 | Chowdhary et al. | 701/214 |
| 2011/0159858 A1 | 6/2011 | Yu et al. | |
| 2011/0199257 A1* | 8/2011 | Lundgren et al. | 342/357.25 |
| 2012/0296594 A1* | 11/2012 | Kristensson et al. | 702/94 |
| 2013/0133421 A1* | 5/2013 | Katz | 73/490 |
| 2013/0312044 A1* | 11/2013 | Itagaki | 725/62 |
| 2014/0012529 A1* | 1/2014 | Lee et al. | 702/94 |

FOREIGN PATENT DOCUMENTS

| | | |
|---|---|---|
| JP | 2005-341600 A | 12/2005 |
| JP | 2006-145340 A | 6/2006 |
| JP | 2009-284409 A | 12/2009 |
| JP | 2010-169490 A | 8/2010 |
| JP | 2011-099854 A | 5/2011 |
| JP | 2011-163969 A | 8/2011 |

* cited by examiner

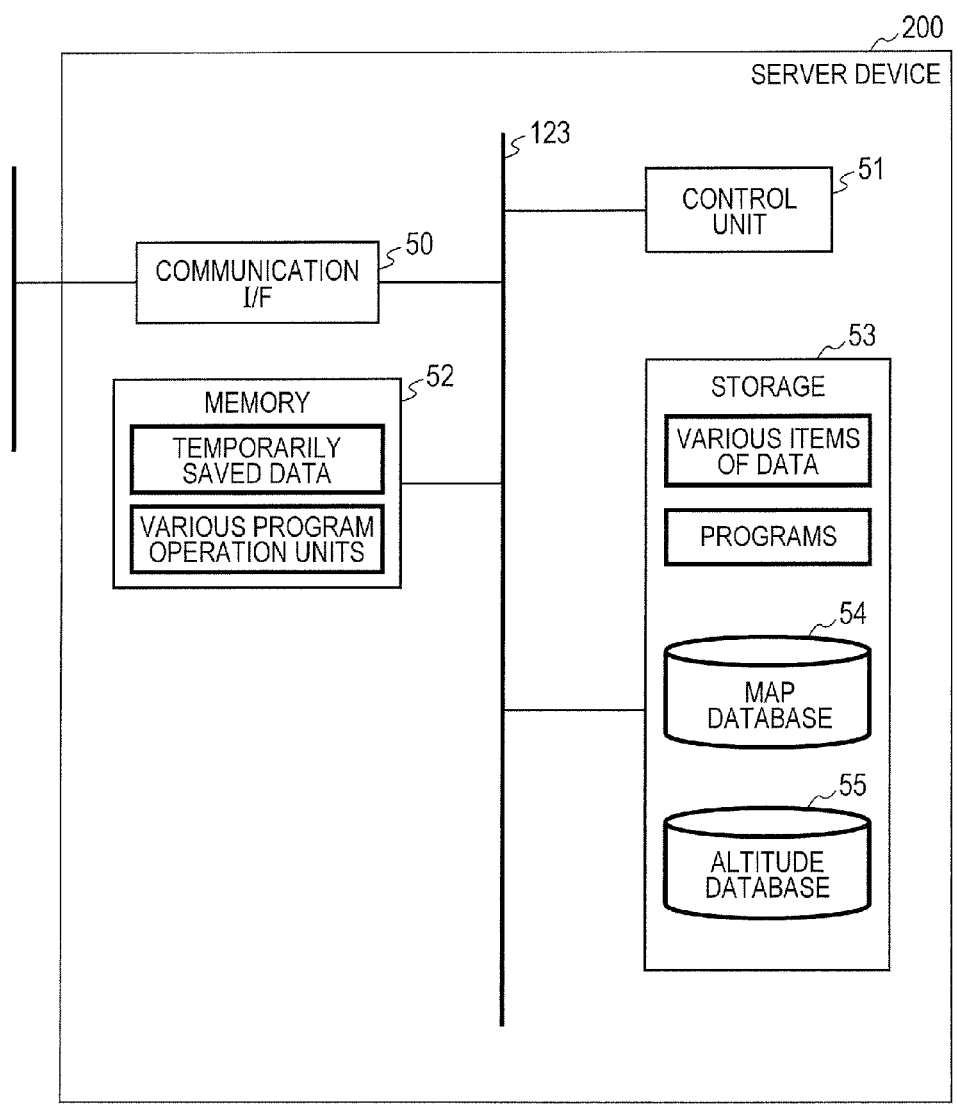

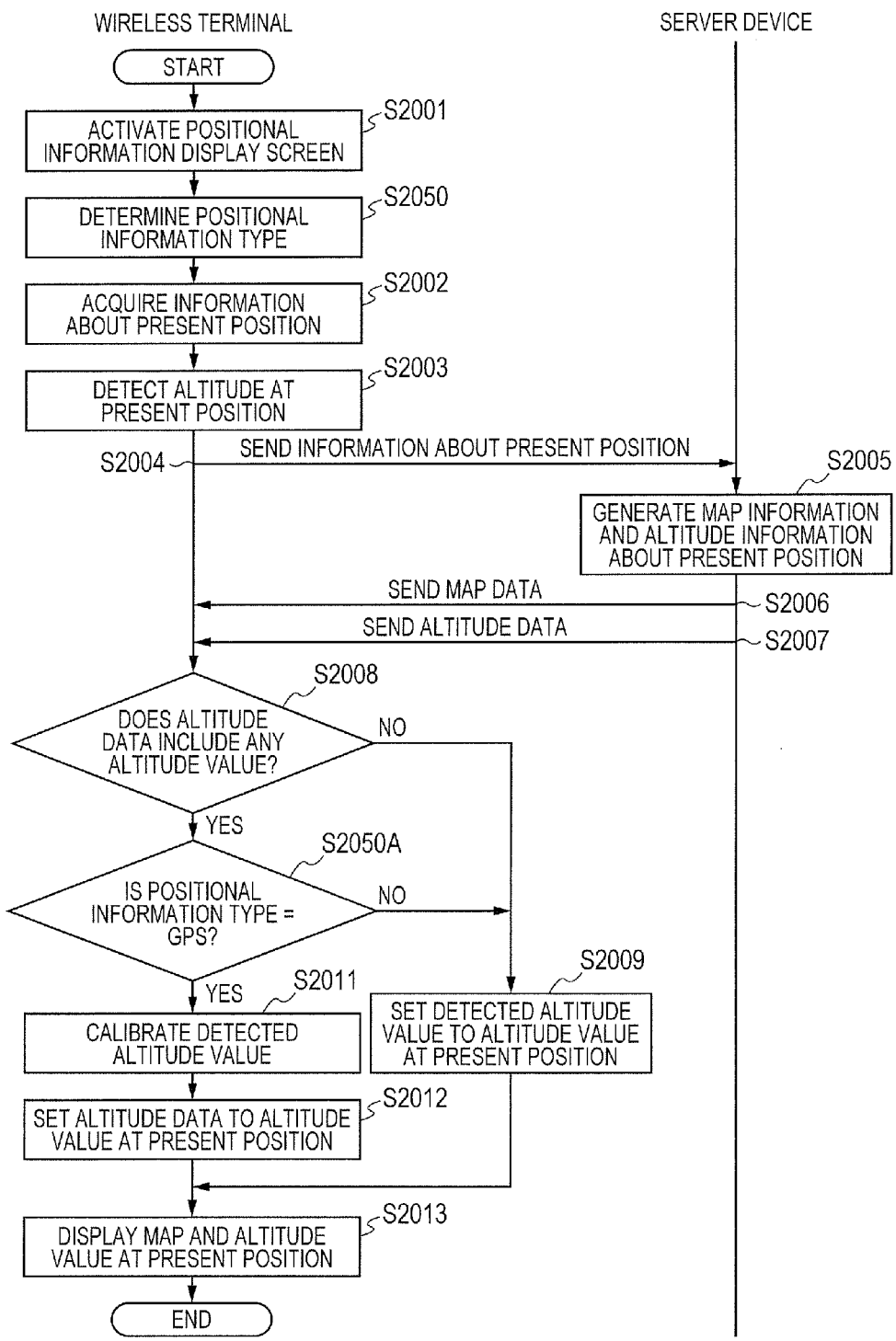

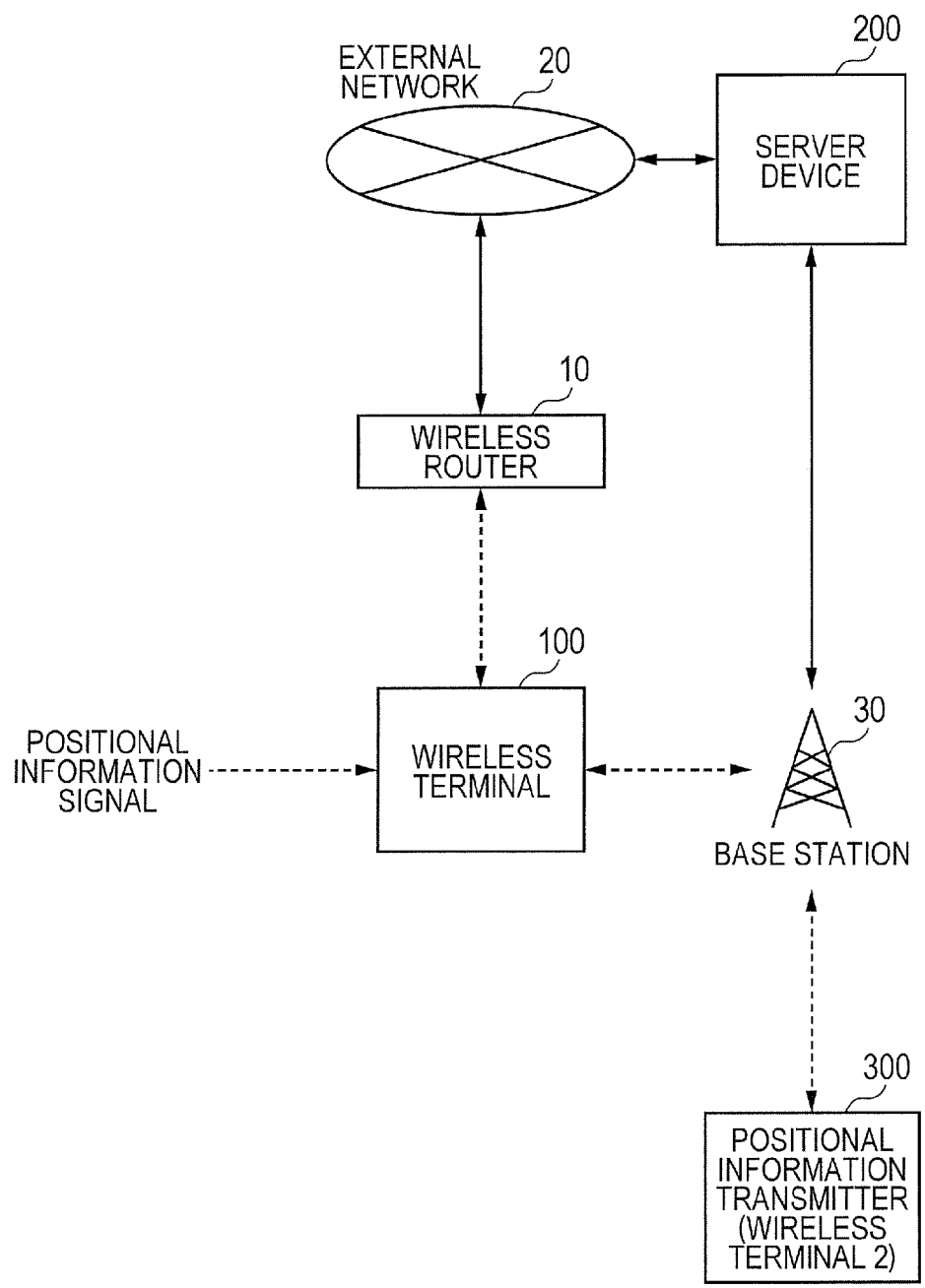

POSITIONAL INFORMATION PROVIDING SYSTEM, NAVIGATION SYSTEM, AND TERMINAL DEVICE

INCORPORATION BY REFERENCE

This application relates to and claims priority from Japanese Patent Application No. 2012-102885 filed on Apr. 27, 2012, the entire disclosure of which is incorporated by reference.

BACKGROUND OF THE INVENTION

1. Field of the Invention

The present invention relates to a positional information providing system, a navigation system, and a terminal device.

2. Description of the Related Art

For background technologies of the technical field, there is Japanese Patent Application Laid-Open Publication No. 2005-070115. The following is described in the publication. When a user manipulates a cellular telephone 3, the cellular telephone 3 detects latitude, longitude, and height at a present position, and sends latitude and longitude to a geographic information service server. When the geographic information service server receives the latitude and the longitude from the cellular telephone 3, the geographic information service server searches a sea level database for sea level data corresponding to the latitude and the longitude, and generates a map image including the latitude and the longitude on the center. The geographic information service server sends the sea level data and the map image to the cellular telephone 3. The cellular telephone 3 calculates a story number of a building from the detected height, the height of the story, and the sea level data, and displays the story number together with the map image.

SUMMARY OF THE INVENTION

Japanese Patent Application Laid-Open Publication No. 2005-070115 discloses a method in which in the case where a user is in a building, for example, the user is able to know on which story of the building the user exists. However, in the case of the invention described in Japanese Patent Application Laid-Open Publication No. 2005-070115, a problem remains in that height information is inaccurate at a position at which sea level data is not available in a building, for example. Moreover, any specific section to highly accurately detect altitude is not disclosed for an altitude detecting unit.

In order to solve the problems, the configuration of an aspect is adopted, for example.

According to the present invention, positional information including altitude information can be highly accurately acquired even though a user is located outdoors or indoors.

Problems, configurations, and effects other than ones described above will be apparent from the following description of embodiments.

BRIEF DESCRIPTION OF THE DRAWINGS

The present invention will become fully understood from the detailed description given hereinafter and the accompanying drawings, wherein:

FIG. 1C is an example of a block diagram of a server device according to the first embodiment;

FIG. 3B is a diagram of an exemplary modification of an operation sequence of the positional information providing system according to the first embodiment;

FIG. 9A is an example of a block diagram of an embodiment of a navigation system according to a second embodiment;

DETAILED DESCRIPTION OF THE PREFERRED EMBODIMENTS

Figure 1A:
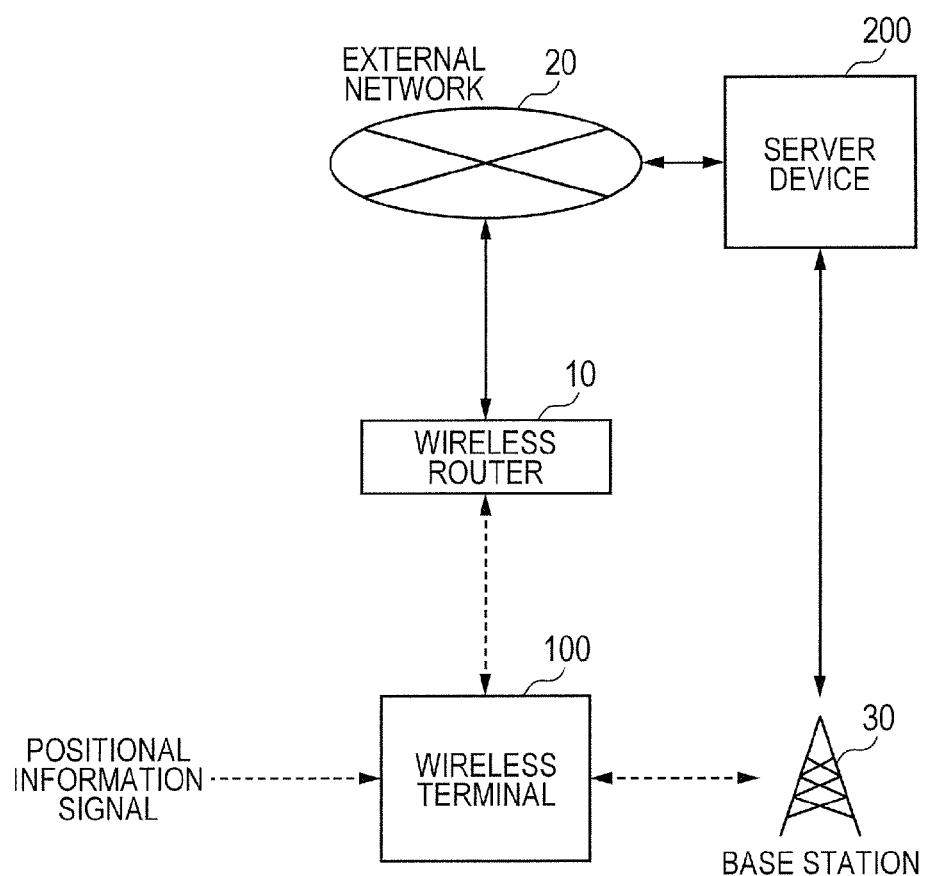
FIG. 1A is a block diagram of an embodiment of a positional information providing system according to a first embodiment.

In the following, embodiments of the present invention will be described with reference to the drawings.
First Embodiment
In the following, a first embodiment of the present invention will be described with reference to FIGS. 1 to 8.
System Configuration
FIG. 1A is a block diagram of an embodiment of a positional information providing system according to a first embodiment.

The positional information providing system according to the embodiment is configured of a wireless terminal 100, a wireless router 10, a server device 200, and an external network 20, for example.

The wireless terminal 100 acquires geographic information from the server device 200 via the external network 20 through the wireless router 10, or via the base station 30 of a mobile communication provider.

When the server device 200 receives positional information from the wireless terminal 100 through the external network 20 or the base station 30, the server device 200 provides, to the wireless terminal 100, geographic information or the like in a predetermined scale that a place indicated by the positional information is on the center.

The wireless router 10 includes a wireless LAN function such as Wi-Fi, and can be connected to the external network 20 through communication lines. Moreover, the wireless router 10 is connected to the wireless terminal 100 and the external network 20, and the wireless terminal 100 can obtain information from an Internet network.

The wireless router 10 is connected to the external network 20 through cables or in a wireless manner, and is supposed to be connected to the wireless terminal 100 through a wireless LAN. Furthermore, the wireless router 10 may be the access point of a wireless LAN such as Wi-Fi. Here, Wi-Fi is the standard of the wireless LAN (Local Area Network) set according to the IEEE 802.11a/IEEE 802.11b standards by the IEEE (Institute of Electrical and Electronics Engineers, Inc.—a U.S. organization).

Figure 1B:
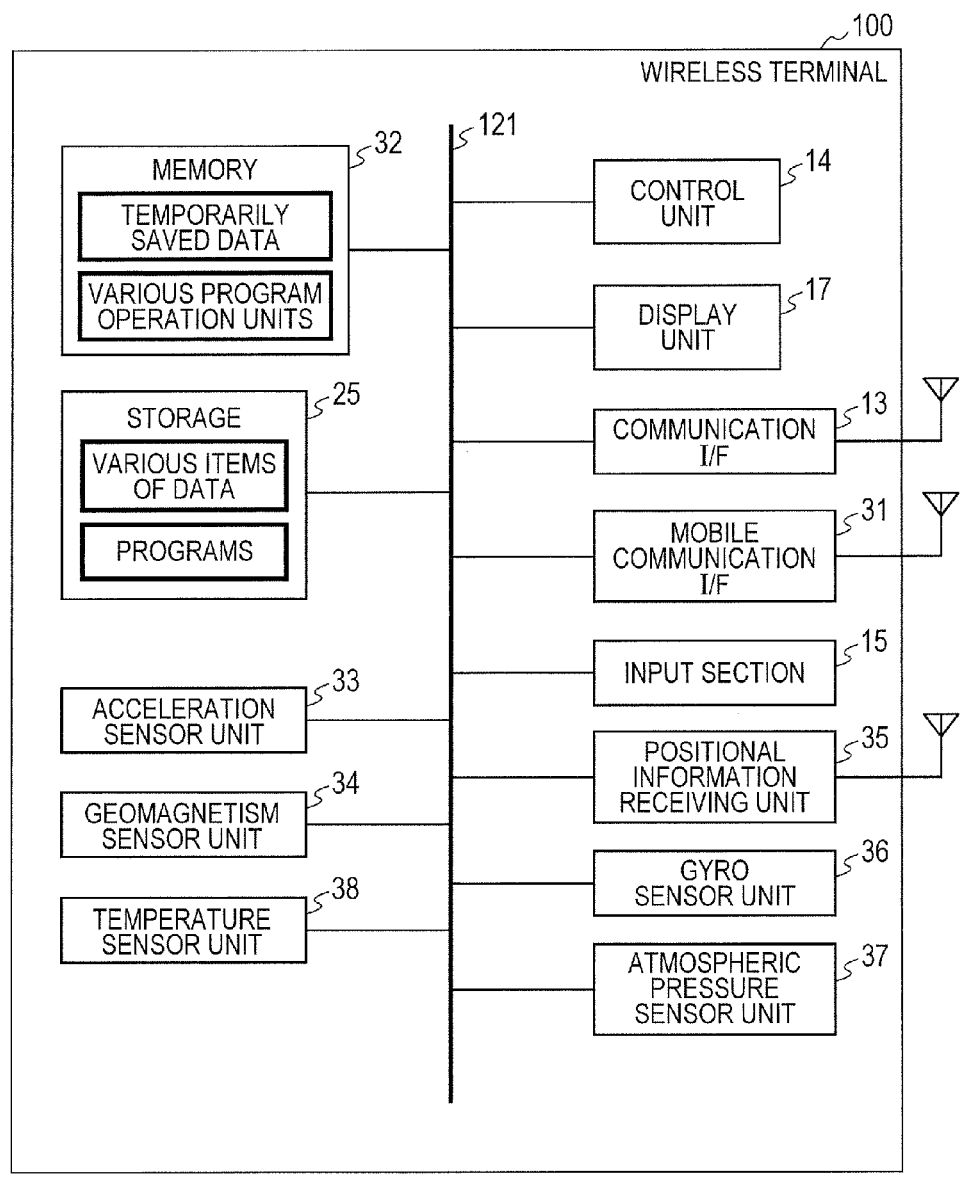
FIG. 1B is an example of a block diagram of a wireless terminal according to the first embodiment.

Wireless Terminal
FIG. 1B is an example of a block diagram of the wireless terminal.

The wireless terminal 100 is configured of a communication I/F 13, a control unit 14, a display unit 17, an input section 15, a storage 25, a mobile communication I/F 31, a memory 32, an acceleration sensor unit 33, a geomagnetism sensor unit 34, a positional information receiving unit 35, a gyro sensor unit 36, an atmospheric pressure sensor unit 37, and a temperature sensor unit 38, for example, and the processing units are connected to each other through a bus 121.

Moreover, the wireless terminal 100 stores application programs on the storage 25. The control unit 14 expands the programs from the storage 25 on the memory 32 and the control unit 14 executes the program, so that various functions can be implemented. In the following description, in order to simplify the description, various functions executed and implemented by executing the application programs by the control unit 14 will be described as various program operation units mainly implement the functions.

It is noted that the application programs may be stored on the storage 25 in advance until the wireless terminal 100 is shipped, or may be stored on a medium such as an optical medium including a CD (Compact Disk) and a DVD (Digital Versatile Disk) and a semiconductor memory and installed on the wireless terminal 100 through a medium connecting unit, not shown. Furthermore, the application programs may be downloaded from the external network 20 through the communication I/F 13 and the wireless router 10 for installation. Alternatively, the application programs may be downloaded from a distributer through the mobile communication I/F 31 and the base station 30 for installation. In addition, such a configuration may be possible in which a personal computer (PC) acquires the application programs through a network, an I/F, not shown, to connect an external device is connected to the PC, and the application programs are moved or copied from the PC to the wireless terminal 100 for installation.

Moreover, the application programs may be implemented by hardware as processing units having similar functions. In the case where the application programs are implemented as hardware, the processing units mainly implement the functions.

The communication I/F 13 is connected to the wireless router 10 through a wireless LAN or the like. The communication I/F 13 is connected to the external network 20 through the wireless router 10, and transmits and receives information with the server device 200 or the like on the external network 20. Such a configuration may be possible in which the communication I/F 13 communicates with the external network 20 through a wireless LAN access point such as Wi-Fi (registered trademark), instead of the communication function with the wireless router 10. The communication I/F 13 may be mounted as chips that establish different communication modes. Furthermore, the communication I/F 13 may be mounted as a single chip that establishes a plurality of communication modes.

The mobile communication I/F 31 is connected to a communication network through the base station 30 using a mobile communication network including the 3G mobile telecommunications systems (in the following, noted as 3G) such as the GSM (Global System for Mobile Communications) mode, the W-CDMA (Wideband Code Division Multiple Access) mode, the CDMA 2,000 mode, and the UMTS (Universal Mobile Telecommunications System) mode, or the LTE (Long Term Evolution) mode, and can transmit and receive information with the server on the communication network.

The control unit 14 receives a user manipulation request through the input section 15, and controls the display unit 17, the communication I/F 13, and various program operation units. Moreover, the control unit 14 also includes a function in which the control unit 14 can acquire map data or altitude data from the external network 20 via the wireless router 10 through the communication I/F 13, or from the server device 200 via the base station 30 through the mobile communication I/F 31 and deliver the map data or the altitude data to various program operation units.

The storage 25 is controlled by an instruction from the control unit 14, and can store the application programs. Furthermore, the storage 25 stores various items of information generated using the application programs.

The memory 32 is controlled by an instruction from the control unit 14. The control unit 14 expands, on the memory 32, the program operation units of the application programs stored on the storage 25.

The display unit 17 is a display section that displays display screens such as a map (a display or a monitor configured of liquid crystals or organic electroluminescence, for example). Moreover, the display unit 17 may be configured integrally with a touch panel described below, for example.

The input section 15 is an input section that accepts a user manipulation to the wireless terminal 100 and inputs control information related to input manipulations. For example, physical buttons or a touch panel can be used. In the following, in the embodiment, an example of using a touch panel will be described. However, such a configuration may be possible in which physical buttons are used for various manipulations.

A manipulation (a drag manipulation) is performed that a given object (a given icon) or the like on the touch panel is moved in the state in which the object is touched by a finger, or a manipulation (a flick manipulation) is performed that an object is moved in such a way that the objet is flipped on the screen with a finger, so that the object or the like can be freely moved. Furthermore, when a manipulation (a tap manipulation) is performed that an object or the like is tapped with a finger once, or a manipulation (a double tap manipulation) is performed that an object or the like is tapped with a finger twice, the object (the icon) or the like can be activated or a screen can be switched to a different screen. In the embodiment, the manipulations on the touch panel will be described as referred to as a drag manipulation, a flick manipulation, and a tap manipulation.

The acceleration sensor unit 33 measures acceleration applied on the wireless terminal 100. The control unit 14 can know which part of the wireless terminal 100 is directed upward by measuring gravitational acceleration using the acceleration sensor unit 33, for example. A screen is displayed in such a way that the upper part of the screen displayed on the display unit 17 is matched with the upper part measured by the acceleration sensor unit 33, so that a screen can be displayed as matched with the manner to hold the wireless terminal 100 by the user.

The geomagnetism sensor unit 34 measures geomagnetism using a plurality of magnetometric sensors, for example, and can acquire information about azimuth. The acquired azimuth information may be considered to be present positional information about the user of the wireless terminal 100. Moreover, the acquired azimuth information may be considered to be information that directs map data in a certain direction such as the north direction as matched with a user's present position.

The positional information receiving unit 35 receives signals transmitted from a plurality of satellites using GPS (Global Positioning System) technology, or receives IMES (Indoor Message System) signals using IMES technology that allows indoor positioning using positional information signals having characteristics similar to the characteristics of GPS signals. The control unit 14 can calculate positional information about the wireless terminal 100 based on the signals received at the positional information receiving unit 35. Moreover, for the indoor positioning mode, the positional information receiving unit 35 may receive wireless LAN signals or the like for acquiring identification information about an access point. Furthermore, the control unit 14 may calculate positional information about the wireless terminal 100 using positional information about a base station used for conversations and communications.

The gyro sensor unit 36 measures the angular velocity of the wireless terminal 100 generated in the case where the user moves the wireless terminal 100, for example.

The atmospheric pressure sensor unit 37 measures an atmospheric pressure using a pressure sensor or the like based on MEMS (Micro-Electro Mechanical System) technology. For example, for an exemplary pressure sensor, there is MPL3115A2 of Freescale Semiconductor, Inc. The control unit 14 can calculate altitude information about the wireless terminal 100 at a present position based on an atmospheric pressure measured at the atmospheric pressure sensor unit 37.

The temperature sensor unit 38 measures temperature around the wireless terminal 100. The control unit 14 can display ambient temperature on the display unit based on the temperature information of the temperature sensor unit 38, the control unit 14 can correct the temperature depending characteristics of the atmospheric pressure sensor unit 37, or the control unit 14 can correct temperature characteristics or the like of the measured atmospheric pressure with respect to altitude.

Server Device

FIG. 1C is an example of a block diagram of the server device 200.

The server device 200 is configured of a communication I/F 50, a control unit 51, a memory 52, and a storage 53, for example, and the processing units are connected to each other through a bus 123.

Moreover, the server device 200 stores application programs on the storage 53. The control unit 51 expands the programs from the storage 53 on the memory 52, and the control unit 51 executes the programs, so that various functions can be implemented.

In the following description, in order to simplify the description, various functions executed and implemented by executing the application programs by the control unit 51 will be described as various program operation units mainly implement the functions.

The communication I/F 50 is connected to the external network 20, and connected to the wireless router 10 through the external network 20. Moreover, the communication I/F 50 is connected to the mobile communication I/F 31 of the wireless terminal 100 through the base station 30 of the mobile communication provider, and transmits and receives various items of information.

The control unit 51 controls the communication I/F 50, the memory 52, the storage 53, and various program operation units. Furthermore, the control unit 51 also includes a function in which the control unit 51 acquires present positional information from the wireless terminal 100 and delivers map data or altitude data stored on a map database 54 and an altitude database 55 of the storage 53 to the wireless terminal 100 through the communication I/F 50 and the external network 20 based on the present positional information.

The storage 53 is controlled by an instruction from the control unit 51, and can store the application programs. Furthermore, the storage 53 stores various items of information generated using the application programs.

The memory 52 is controlled by an instruction from the control unit 51. The control unit 51 expands, on the memory 52, the program operation units of the application programs stored on the functioning units of the storage 53.

The map database 54 is a map data storage section that stores map data. The map data also includes the shape data of buildings, facilities, and the like displayed on a map. Moreover, although map data is stored on the map database 54 in advance, the latest map data may be downloaded from a server that provides the latest map through the external network 20 for updating the map database 54.

The altitude database 55 is an altitude data storage section that stores altitude data corresponding to the map data of the map database 54. For the altitude data, such a value is used, for example, in which artificial structures such as houses, elevated structures, and bridges and vegetation such as trees are removed by filtering, for example, from altitude data acquired by aerial laser scanner measurement for interpolation at a predetermined interval and the value is found. Furthermore, although altitude data is stored on the altitude database 55 in advance, the latest altitude data may be downloaded from a server that provides the latest map (altitude), for example, through the external network 20 for updating the altitude database 55.

Software Configuration

Figure 2A:
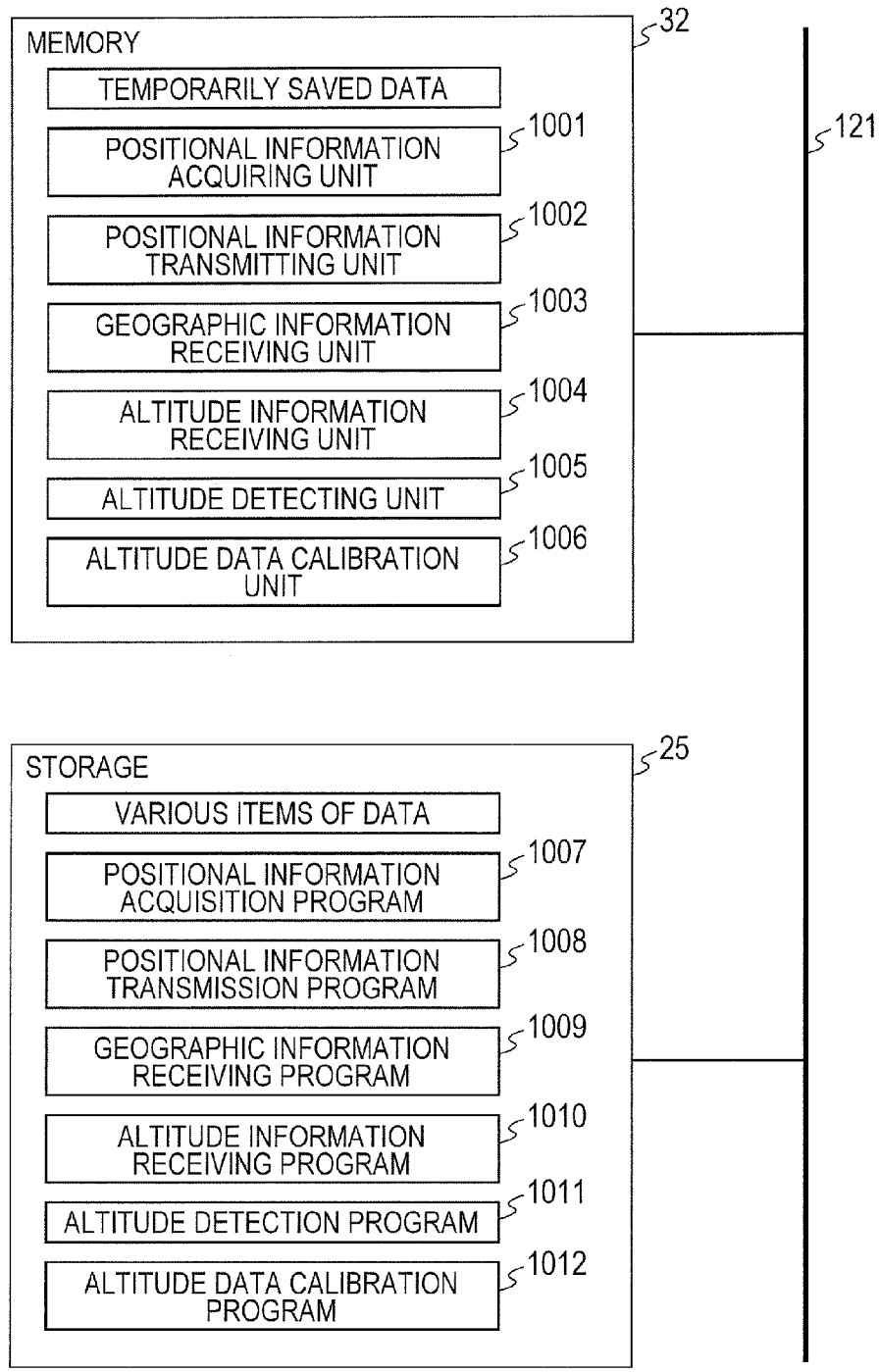
FIG. 2A is an example of an illustration of information on a memory and a storage of the wireless terminal according to the first embodiment.

FIG. 2A is an illustration of the functions of a positional information acquisition program, a positional information transmission program, a geographic information receiving program, an altitude information receiving program, an altitude detection program, and an altitude data calibration program of the wireless terminal 100.

In FIG. 2A, the storage 25 and the memory 32 are shown in the configuration of the wireless terminal 100.

In FIG. 2A, the storage 25 stores a positional information acquisition program 1007, a positional information transmission program 1008, a geographic information receiving program 1009, an altitude information receiving program 1010, an altitude detection program 1011, and an altitude data calibration program 1012. The control unit 14 expands the positional information acquisition program 1007, the positional information transmission program 1008, the geographic information receiving program 1009, the altitude information receiving program 1010, the altitude detection program 1011, and the altitude data calibration program 1012 on the memory 32 as a positional information acquiring unit 1001, a positional information transmitting unit 1002, a geographic information receiving unit 1003, an altitude information receiving unit 1004, an altitude detecting unit 1005, and an altitude data calibration unit 1006, and the control unit 14 executes the programs, so that various functions can be implemented. The positional information acquisition program 1007, the positional information transmission program 1008, the geographic information receiving program 1009, the altitude information receiving program 1010, the altitude detection program 1011, and the altitude data calibration program 1012 may be stored on the storage 25 at a point in time when a product is shipped, or may be downloaded through the communication I/F 13 or the mobile communication I/F 31.

In the following description, in order to simplify the description, various functions executed and implemented by executing the application programs by the control unit 14 will be described as various program operation units mainly implement the functions.

The positional information acquiring unit 1001 acquires present positional information based on positional information signals such as GPS signals or IMES signals received at the positional information receiving unit 35. The positional information transmitting unit 1002 transmits the acquired present positional information to the server device 200 via the external network 20 through the communication I/F 13, or via the base station 30 through the mobile communication I/F 31.

The geographic information receiving unit 1003 acquires map data including the present positional information on the center from the server device 200. Moreover, the map data also includes the shape data of buildings, facilities, and the like, and it can be determined whether the present position is located on the outside or the inside of a building, facility, or the like.

The altitude information receiving unit 1004 acquires altitude information based on the present positional information from the server device 200.

The altitude detecting unit 1005 calculates altitude data from conversion between atmospheric pressure and altitude data using a correspondence table, proportional approximation, or an equation, described later, based on an atmospheric pressure measured at the atmospheric pressure sensor unit 37.

The altitude data calibration unit 1006 calibrates the altitude data acquired at the altitude detecting unit 1005 based on the altitude information acquired from the server device 200. Furthermore, in the case where it is determined that the positional information indicates that the user is located on the inside of a building, facility, or the like, the altitude data is not calibrated, and the altitude data detected at the altitude detecting unit 1005 can be used. In addition, when the difference between the altitude data detected at the altitude detecting unit 1005 and the altitude data of the altitude information is within a predetermined altitude difference, the altitude data may not be calibrated.

The detail of the altitude detecting unit, altitude data, and calibration will be described later in the chapters of Altitude Detecting Unit and Altitude Data.

Figure 2B:
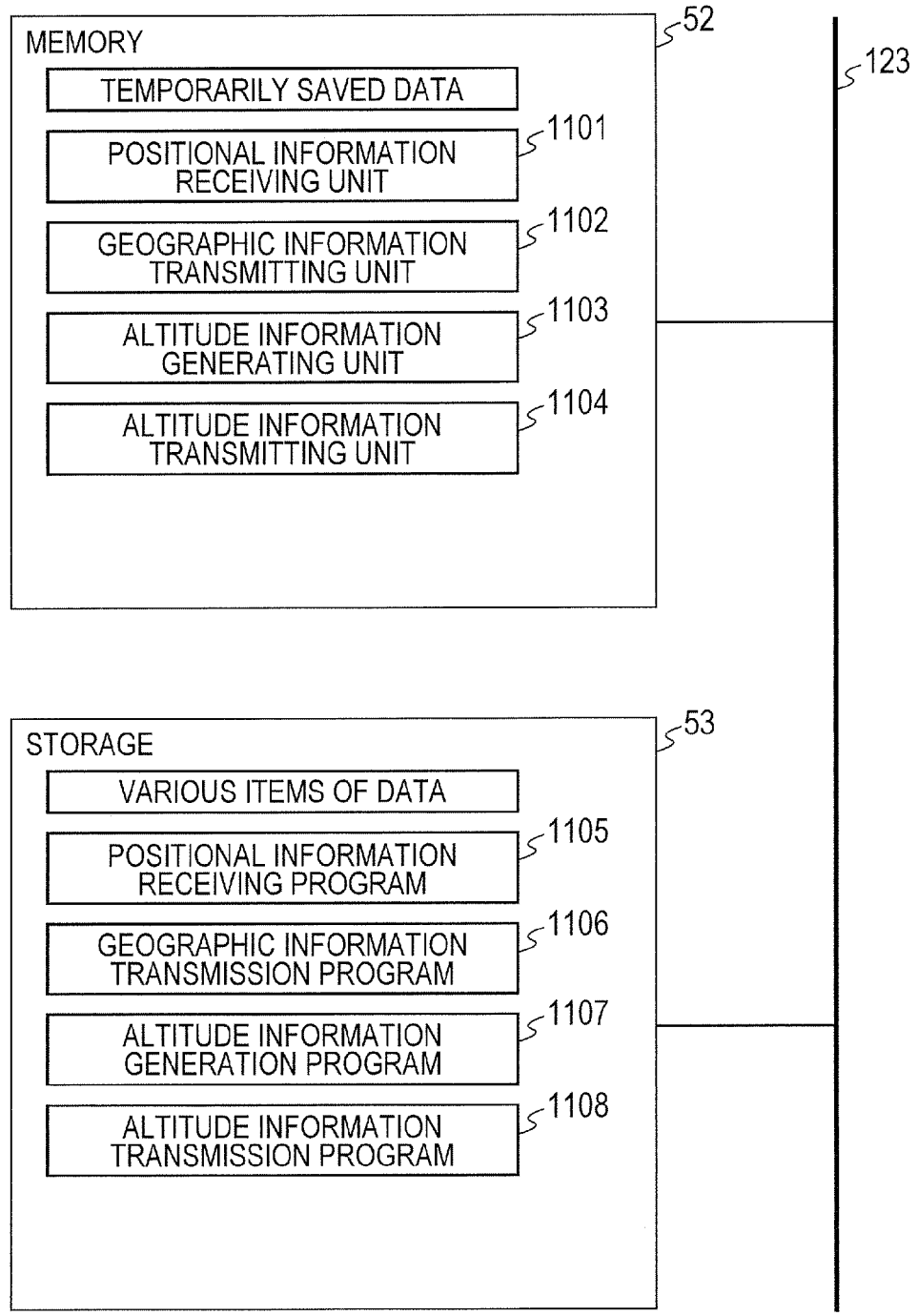
FIG. 2B is an example of an illustration of information on a memory and a storage of the server device according to the first embodiment.

FIG. 2B is an illustration of the functions of a positional information receiving program, a geographic information transmission program, an altitude information generation program, and an altitude information transmission program of the server device 200.

In FIG. 2B, the storage 53 stores a positional information receiving program 1105, a geographic information transmission program 1106, an altitude information generation program 1107, and an altitude information transmission program 1108. The positional information receiving program 1105, the geographic information transmission program 1106, the altitude information generation program 1107, and the altitude information transmission program 1108 are expanded on the memory 52 as a positional information receiving unit 1101, a geographic information transmitting unit 1102, an altitude information generating unit 1103, and an altitude information transmitting unit 1104, and the control unit 51 executes the programs, so that various functions can be implemented. The positional information receiving program 1105, the geographic information transmission program 1106, the altitude information generation program 1107, and the altitude information transmission program 1108 can be acquired from an external storage or the like in advance for storage.

The positional information receiving unit 1101 includes a function in which the positional information receiving unit 1101 can acquire positional information about the wireless terminal 100 from the wireless terminal 100 via the external network 20 or via the base station 30 through the communication I/F 50 and deliver the positional information to various program operation units. Moreover, the positional information receiving unit 1101 also includes a function in which the positional information receiving unit 1101 acquires the map data of the present position from the map database 54 based on the acquired positional information and delivers the map data to the geographic information transmitting unit 1102.

The altitude information generating unit 1103 acquires altitude data corresponding to the map data from the altitude database 55 based on the positional information acquired from the positional information receiving unit 1101, and delivers the altitude data to the altitude information transmitting unit 1104.

The altitude information transmitting unit 1104 transmits the altitude data acquired from the altitude information generating unit 1103 to the wireless terminal 100 via the external network 20 or the base station 30 through the communication I/F 50.

Operation Sequence

Figure 3A:
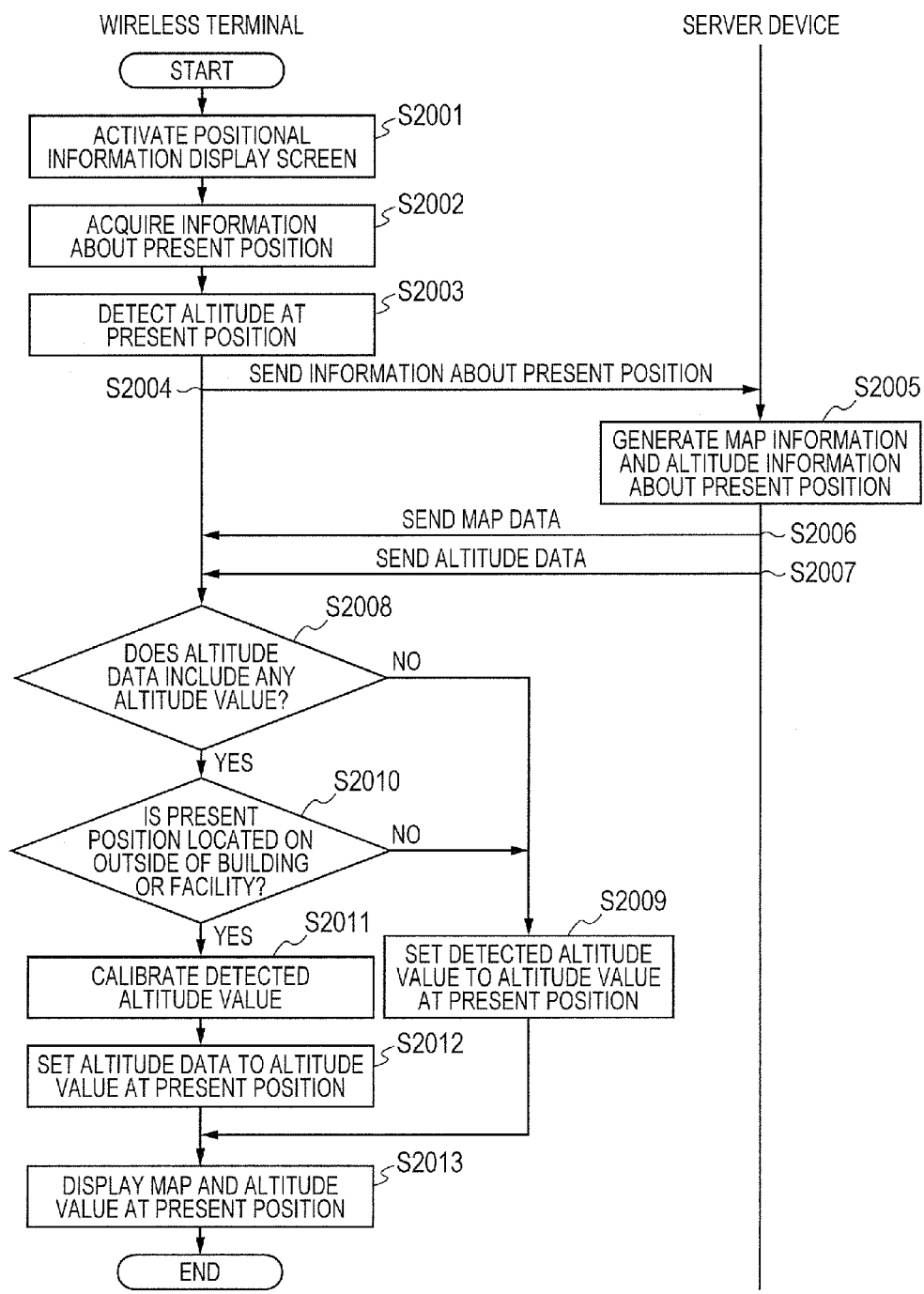
FIG. 3A is an operation sequence diagram of an exemplary process of the positional information providing system according to the first embodiment.

FIG. 3A is an operation sequence diagram of an exemplary process of the positional information providing system according to the first embodiment.

The control unit 14 of the wireless terminal 100 receives an instruction to activate a positional information display screen from the input section 15, and then activates the positional information display screen (S2001). The positional information acquiring unit 1001 acquires positional information calculated from positional information signals including latitude and longitude, for example, received at the positional information receiving unit 35 (S2002).

The altitude detecting unit 1005 calculates altitude information based on an atmospheric pressure measured at the atmospheric pressure sensor unit 37 (S2003), and temporarily saves the altitude information as an altitude value at the present position on the memory 32.

The positional information transmitting unit 1002 transmits the present positional information acquired at the positional information acquiring unit 1001 to the server device 200 via the external network 20 or the base station 30 (S2004).

Subsequently, the control unit 51 of the server device 200 generates geographic information and altitude information from the map database 54 and the altitude database 55 based on the present positional information received from the wireless terminal 100 (S2005), and transmits map data and altitude data to the wireless terminal 100 via the external network 20 or the base station 30 (S2006 and S2007).

The control unit 14 of the wireless terminal 100 temporarily saves the map data and the altitude data received from the server device 200 on the memory 32.

Subsequently, in the case where the altitude data received from the server device 200 includes an altitude value at the present position (S2008: YES), the control unit 14 determines whether the present position is located on the outside of a building, facility, or the like from the shape data of buildings, facilities, and the like included in the map data (S2010). In the case where the control unit 14 determines that the present position is located on the outside (S2010: YES), the altitude data is calibrated in such a way that the altitude value acquired in Step 2003 is the altitude data acquired in Step 2007 (S2011), and the altitude data is set to an altitude value at the present position (S2012). Moreover, in the case where the altitude data received from the server device 200 does not include any altitude value at the present position (S2008: NO), or in the case where it is determined that the present position is located on the inside of a building, facility, or the like (S2010: NO), the altitude data is not calibrated, and the altitude value detected at the altitude detecting unit 1005 is set to an altitude value at the present position (S2009). Through Step 2009 or Step 2012 described before, the control unit 14 displays a map and the altitude value at the present position on the display unit 17 (S2013).

Furthermore, for the calibration in Step 2011, such a configuration may be possible, as described later, in which a difference between the detected altitude data calculated from an atmospheric pressure measured at the atmospheric pressure sensor unit 37 and altitude data based on aerial laser measurement or the like is temporarily saved as an offset value on the memory 32 and altitude data is found from the detected altitude data calculated from an atmospheric pressure measured at the atmospheric pressure sensor unit 37. With this configuration, even in the case where it is difficult to acquire altitude data based on aerial laser measurement or the like, an altitude value can be acquired.

Moreover, in the case where the determined result is not changed in Step 2010, the calibration in Step 2011 may not be performed.

Furthermore, for a method of determining whether the present position is located on the outside of a building, facility, or the like in Step 2010, the result determined at the server device 200 from the relationship between the shape information about buildings, facilities, and the like and the present position may be transmitted to the wireless terminal 100. Alternatively, the wireless terminal 100 determines whether the present position is located on the outside of a building, facility, or the like from the relationship between the shape information about buildings, facilities, and the like included in geographic information transmitted from the server device 200 and the present position.

When altitude data is once calibrated on the outside of buildings, facilities, and the like in Steps 2011 and 2012, an altitude value can be highly accurately acquired even on the inside of a building, facility, or the like (S2010: NO) until the atmospheric pressure is greatly changed due to a change in an environment.

FIG. 3B is a diagram of an exemplary modification of the operation sequence of the positional information providing system according to the first embodiment.

Step 2050 is additionally provided on the operation sequence shown in FIG. 3A, and Step 2050A is additionally provided instead of Step 2010.

The control unit 14 of the wireless terminal 100 receives an instruction to activate a positional information display screen from the input section 15, and then activates the positional information display screen (S2001). The positional information acquiring unit 1001 acquires positional information types indicating types of positioning modes from positional information signals received at the positional information receiving unit 35, and temporarily saves the positional information types on the memory 32 (S2050). Moreover, the positional information acquiring unit 1001 acquires positional information calculated from the positional information signals received at the positional information receiving unit 35 (S2002).

The altitude detecting unit 1005 calculates altitude information based on an atmospheric pressure measured at the atmospheric pressure sensor unit 37 (S2003), and temporarily saves the altitude information as an altitude value at the present position on the memory 32.

The positional information transmitting unit 1002 transmits the present positional information acquired at the positional information acquiring unit 1001 to the server device 200 via the external network 20 or the base station 30 (S2004).

Subsequently, the control unit 51 of the server device 200 generates geographic information and altitude information from the map database 54 and the altitude database 55 based on the present positional information received from the wireless terminal 100 (S2005), and transmits map data and altitude data to the wireless terminal 100 via the external network 20 or the base station 30 (S2006 and S2007).

The control unit 14 of the wireless terminal 100 temporarily saves the map data and the altitude data received from the server device 200 on the memory 32.

Subsequently, in the case where the altitude data received from the server device 200 includes an altitude value at the present position (S2008: YES), the control unit 14 makes reference to the positional information types that are determined in Step 2050 and temporarily saves the positional information types on the memory 32, and the control unit 14 determines whether the positional information type is a GPS signal (S2050A). In the case of a GPS signal (S2050A: YES), it can be considered that the position of the user is located on the outside of a building, facility, or the like, so that the altitude data is calibrated in such a way that the altitude value acquired in Step 2003 is the altitude data acquired in Step 2007 (S2011), and the altitude data is set to an altitude value at the present position (S2012). Moreover, in the case where the altitude data does not include any altitude value at the present position (S2008: NO), or in the case where it is determined that the positional information type is not a GPS signal (A: NO), it can be considered that the position of the user is located on the inside of a building, facility, or the like, so that the altitude data is not calibrated, and the altitude value detected at the altitude detecting unit 1005 is set to an altitude value at the present position (S2009). Through Step 2009 or Step 2012 described before, the control unit 14 displays a map and the altitude value at the present position on the display unit 17 (S2013).

Furthermore, as similar to the case of FIG. 3A, for the calibration in Step 2011, such a configuration may be possible, as described later, in which a difference between the detected altitude data calculated from an atmospheric pressure measured at the atmospheric pressure sensor unit 37 and altitude data based on aerial laser measurement or the like is temporarily saved as an offset value on the memory 32 and altitude data is found from the detected altitude data calculated from an atmospheric pressure measured at the atmospheric pressure sensor unit 37. With this configuration, even in the case where it is difficult to acquire altitude data based on aerial laser measurement or the like, altitude value data can be acquired.

In addition, in the case where the determined result is not changed in Step 2050A, the calibration in Step 2011 may not be performed.

Altitude Detecting Unit

Figure 4A:
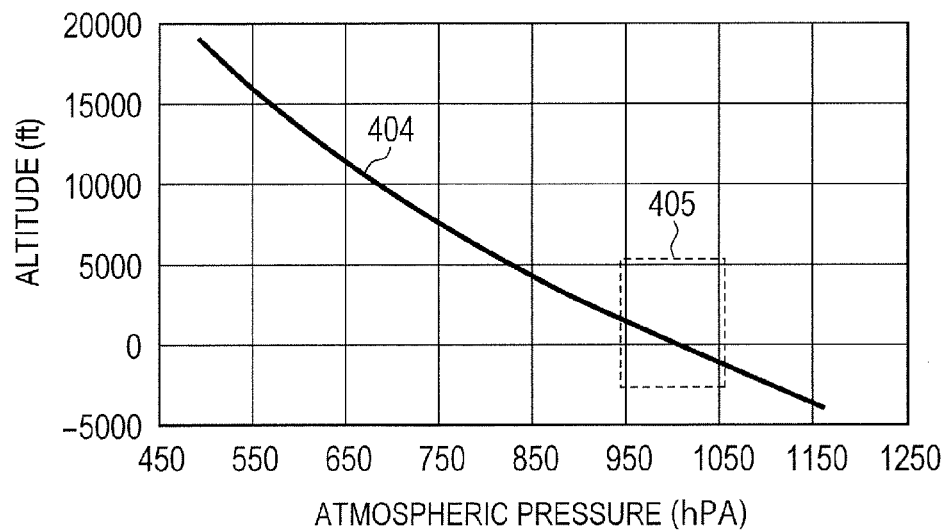
FIG. 4A is an example of a diagram of the relationship between atmospheric pressure and altitude.

FIG. 4A is a diagram of the relationship between atmospheric pressure and altitude.

Altitude H to atmospheric pressure P can be generally found from the following equation.

$$H=504.6*(t0+273.2)*(1-(P/P0)^{0.1902})(ft)$$

Here, P0 (hPA) and t0 (° C.) are the atmospheric pressure and the atmospheric temperature, respectively, on the ground, that is, H=0 ft. FIG. 4A is a characteristic diagram where P0=1013.25 hPA and t0=15° C.

When the atmospheric pressure is changed from 500 to 1150 hPA, the altitude is changed from about 18,000 to about −4,000 ft, and expressed non-linearly. However, as illustrated in FIG. 4B, when a change in the atmospheric pressure ranges from 950 to 1050 hPA in everyday life, it can be considered that the altitude is changed linearly.

Moreover, the calculation of the altitude to the atmospheric pressure may be found using the equation above, or the altitude may be found by in advance providing a data table for conversion between the atmospheric pressure and the altitude. Furthermore, in the case of a data table, the altitude to a given atmospheric pressure can also be found by leaner approximation in the range in which the altitude can be considered to be linear.

Figure 4B:
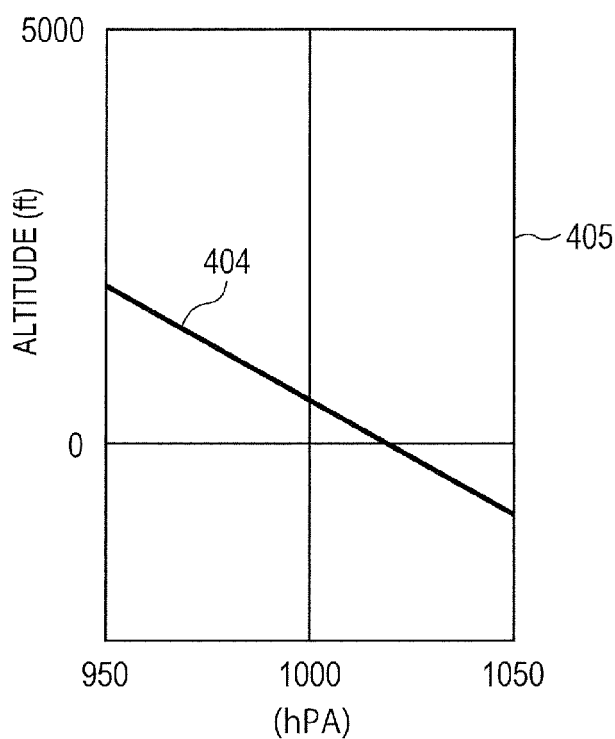
FIG. 4B is an example of an enlarged characteristic diagram of a practical atmospheric pressure range portion (950 to 1050 hPA) for a characteristic.

FIG. 4B is an enlarged characteristic diagram of a practical atmospheric pressure range portion 405 (950 to 1050 hPA) of a characteristic 404.

Although altitude data is changed depending on the surface temperature and the surface pressure, the measurement of the absolute value of the atmospheric pressure is particularly important. Moreover, in order to determine on which story of a building the user exists, such resolution is necessary that at least the height of stories of the building is determined. For example, in the case of MPL3115A2 of Freescale Semiconductor, Inc., the theoretically minimum resolution is 0.3 m (about 1 ft) in altitude conversion, and it is necessary for highly accurate measurement to make calibration on factory production lines.

Furthermore, in the measurement of atmospheric pressures using a pressure sensor, desirably, automatic calibration is performed when using the pressure sensor because the pressure sensor is prone to be affected by a change in the atmospheric pressure due to variations over time, weather, or the like.

Thus, in the embodiment, the atmospheric pressure sensor unit 37 is automatically calibrated using altitude data based on aerial laser measurement or the like, so that an altitude value from the sea level is acquired with no influence of a change in an environment due to variations over time, weather, or the like. In addition, the atmospheric pressure sensor unit 37 measures an atmospheric pressure when it is difficult to use altitude data because the user is located on the inside of a building or the like, so that the detected altitude data can be acquired.

Figure 5:
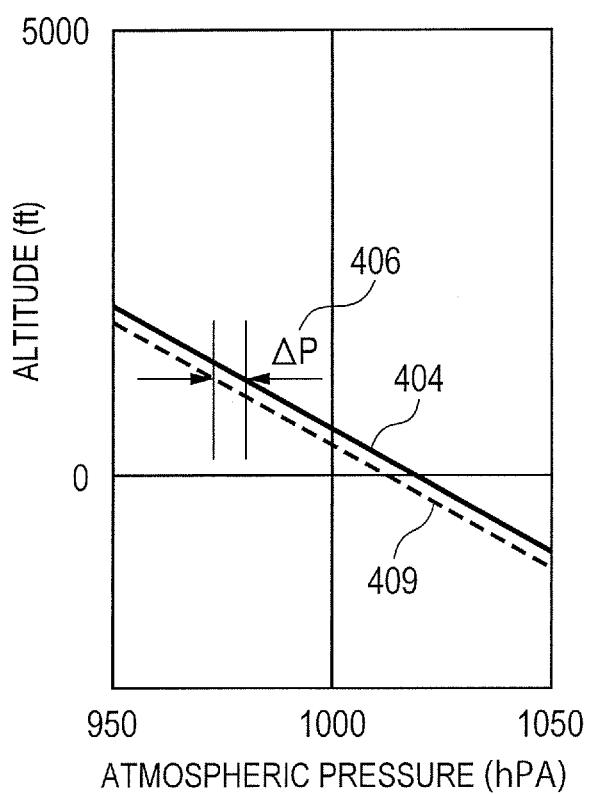
FIG. 5 is an example of a characteristic diagram that a characteristic is corrected by an offset value.

FIG. 5 is a characteristic diagram of a characteristic 409 that the characteristic in FIG. 4B is corrected using an offset value 406.

For an exemplary calibration, a difference between the detected altitude data calculated from an atmospheric pressure measured at the atmospheric pressure sensor unit 37 and altitude data based on aerial laser measurement or the like is calculated as the offset value 406, and the following equation is used to find altitude data when it is difficult to correctly detect altitude data. Moreover, in the case where the altitude to the atmospheric pressure is found using the equation above, the value of P0 (hPA) may be set to an offset value from the standard value (1013.25 hPA).

altitude data=detected altitude data+offset value

Here, the calibration may be performed when the offset value 406, which is a difference between the detected altitude data calculated from an atmospheric pressure measured at the atmospheric pressure sensor unit 37 and altitude data based on aerial laser measurement or the like, exceeds a predetermined offset value. Furthermore, at a place near the coast near the sea level, the calibration may be performed in such a way that altitude value data is manually determined to be 0 ft without using altitude data based on aerial laser measurement or the like.

Altitude Data

Figure 6:
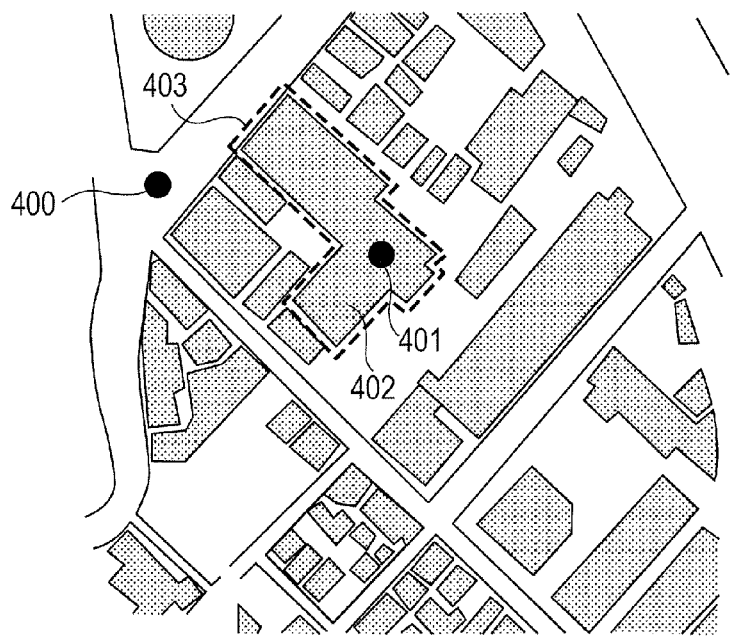
FIG. 6 is an example of an illustration of altitude data at a specific location on map data.

FIG. 6 is an illustration of altitude data at a specific location on map data.

The altitude is generally measured by aerial laser measurement. The aerial laser measurement is a method for three-dimensionally measuring the earth's surface at coordinates (x, y) in the horizontal direction and the height (z) using a laser distance measuring device or the like mounted on an air plane. Since altitude data is data that artificial structures such as houses, elevated structures, and bridges and vegetation such as trees are filtered, in the case where positional information indicates a point located on the inside of a building, altitude data indicates the altitude of a position around the building, but does not indicate the height or the like of the building, for example.

In FIG. 6, a specific position 400 indicates a point located on the outside of a building, facility, or the like, and a specific location 401 indicates a point located on the inside of a building, facility, or the like.

Altitude data is altitude data in the case where it is assumed that there are no buildings, facilities, and the like, and the altitude data of the specific position 400 located on the outside of a building, facility, or the like and the altitude data of the specific position 401 located on the inside take the same altitude value like 10.5 m, for example. Thus, in the case where a building or facility includes a plurality of stories and two positions exist in different stories mutually at the specific position 401, the two positions are expressed at the same position on a map even in the mode that can acquire indoor positional information such as in the IMES mode.

Therefore, in the embodiment, as described in the operation sequence in FIG. 3A, it is determined whether the present position of the user is within shape data using the shape data of a building, facility, or the like, and it is determined whether the position of the user is located on the inside or the outside of a building, facility, or the like. In the case where the position of the user is located on the outside, altitude data based on aerial laser measurement or the like is used, whereas in the case where the position of the user is located on the inside, altitude data detected at the wireless terminal is used, so that an altitude value is displayed even though the position of the user is located on the inside of a building or facility.

A broken line 403 on the outside of a building 402 is a threshold line in the case of determining the shape of the building 402. Since positional information includes measurement errors, a range outside the shape of the building 402 may be determined as a threshold in consideration of the measurement errors. The broken line 403 outside the building 402 is used to determine the threshold, so that altitude data can be correctly acquired on the inside of the building 402 even in the case where it is difficult to acquire positional information on the inside of the building 402.

Moreover, such a configuration may be possible in which suppose that the shape of the building 402 is a first threshold and the broken line 403 is a second threshold, in the case where the user goes from the inside to the outside of the building 402, it is determined that the user goes from the inside to the outside when the second threshold is exceeded, whereas in the case where the user comes from the outside to the inside of the building 402, it is determined that the user comes from the outside to the inside when the first threshold is exceeded. With this configuration, an unstable determination state caused by measurement errors or the like near the boundary of a building can be eliminated.

Furthermore, in the embodiment, as described in the operation sequence in FIG. 3B, information types indicating types of positioning modes are acquired from positional information signals received at the positional information receiving unit 35. In the case where the positional information type is a GPS signal, it is determined that the position of the user is located on the outside of a building, facility, or the like, whereas in the case where the positional information type is not a GPS signal (in the case of the indoor positioning mode such as an IMES signal or the like), it is determined that the position of the user is located on the inside of a building, facility, or the like, so that an altitude value can be displayed even though the user is located on the inside of a building or facility as similar to the case of FIG. 3A.

Exemplary Display Screens

Next, exemplary display screens will be described in the case where the input section 15 of the wireless terminal 100 accepts a manipulation from the user and positional information is displayed on the wireless terminal 100.

Figure 7:
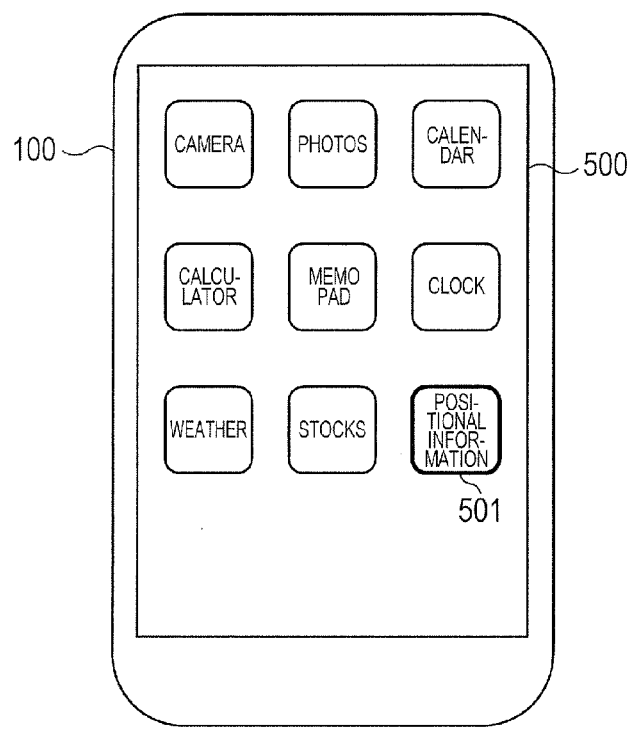
FIG. 7 is an exemplary display of a menu screen of the wireless terminal.

FIG. 7 is an exemplary display of a menu screen of the wireless terminal 100.

Figure 8A:
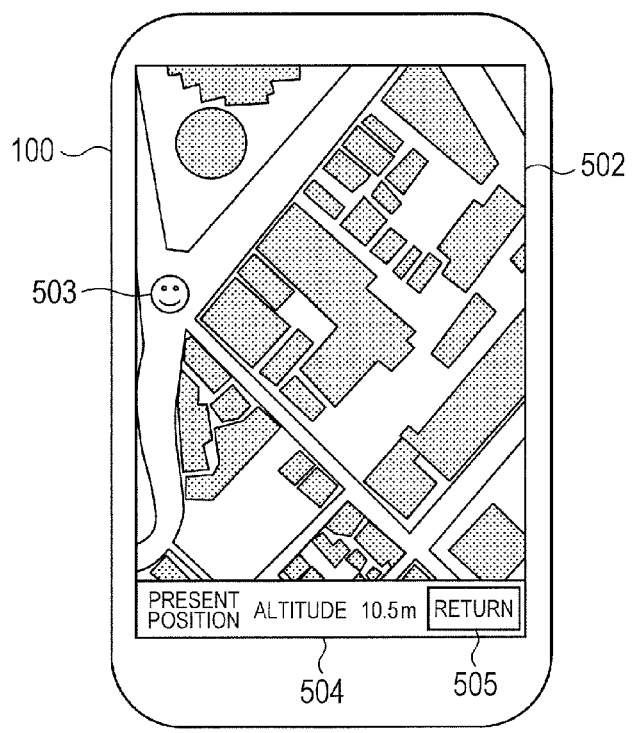
FIG. 8A is a first display example of a positional information screen.
Figure 8B:
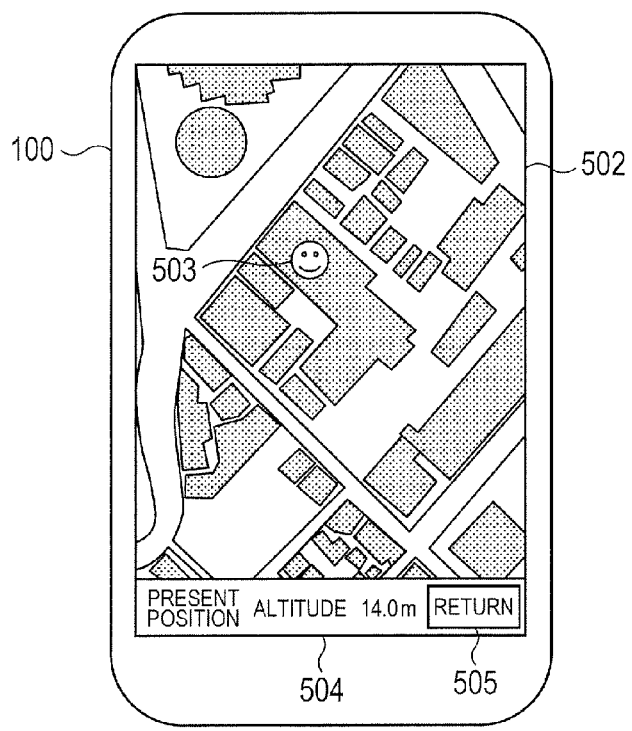
FIG. 8B is a second display example of the positional information screen.

FIGS. 8A and 8B are exemplary displays of positional information screens.

In FIG. 7, when positional information 501 is tapped, a positional information screen 502 as shown in FIG. 8A is displayed on the display unit 17 of the wireless terminal 100 based on the operation sequence shown in FIG. 3A or FIG. 3B. The positional information display screen 502 is configured of a map, a user's present position 503, and a navigation indication 504, for example. Moreover, a return button 505 is selected, so that the positional information display screen 502 is closed, and a screen before transition can be returned.

The navigation indication 504 indicates the altitude at the present position where the user is located. The present position 503 is located on the outside of a building, and indicates an altitude value based on altitude data by aerial laser measurement or the like. Furthermore, in the case where the user moves in the inside of a building as shown in FIG. 8B, the atmospheric pressure sensor unit 37 measures an atmospheric pressure when it is difficult to use altitude data because the user is located on the inside of a building or the like, so that an altitude value based on the detected altitude data can be displayed.

In addition, such a configuration may be possible in which in addition to the shape data of buildings, facilities, and the like included in map data, story information including the altitude of each story is additionally provided and on which story the user is located is displayed based on an altitude value on the ground.

Moreover, in the case where it is difficult to acquire positional information because positional information signals are not received as the user is located on the inside of a building, facility, or the like, only altitude or a story may be shown.

As described above, with the calibration in Steps 2011 and 2012 described before, a change in the atmospheric pressure caused by a change in an environment such as weather is hardly affected, and altitude data can be highly accurately known even on the outside or on the inside of a building or facility.

Second Embodiment

In the following, a second embodiment of the present invention will be described with reference to FIGS. 1A to 3B and FIGS. 9A to 15.

It is noted that in the embodiment, a comparison will be made with the first embodiment, and different points will be emphasized and described.

System Configuration

FIG. 9A is a block diagram of an embodiment of a navigation system according to a second embodiment.

The navigation system according to the embodiment is configured of a wireless terminal 100, a wireless router 10, a server device 200, an external network 20, and a positional information transmitter 300, for example. In the system configuration in the second embodiment, the positional information transmitter 300 is additionally provided on the system configuration in FIG. 1A.

The positional information transmitter 300 transmits positional information including altitude information about a user. The positional information transmitter 300 may be a wireless terminal having a function similar to the function of the wireless terminal 100. Moreover, the positional information transmitter 300 may be a positional information transmitter that indicates a specific place such as a building, a facility, and the like. Furthermore, the positional information transmitter 300 is connected to a communication network through a base station 30 using a mobile communication network, and can transmit and receive information with the server device 200 on the communication network.

In the embodiment, the positional information transmitter 300 will be described as a wireless terminal having a function similar to the function of the wireless terminal 100.

Wireless Terminal

Figure 9B:
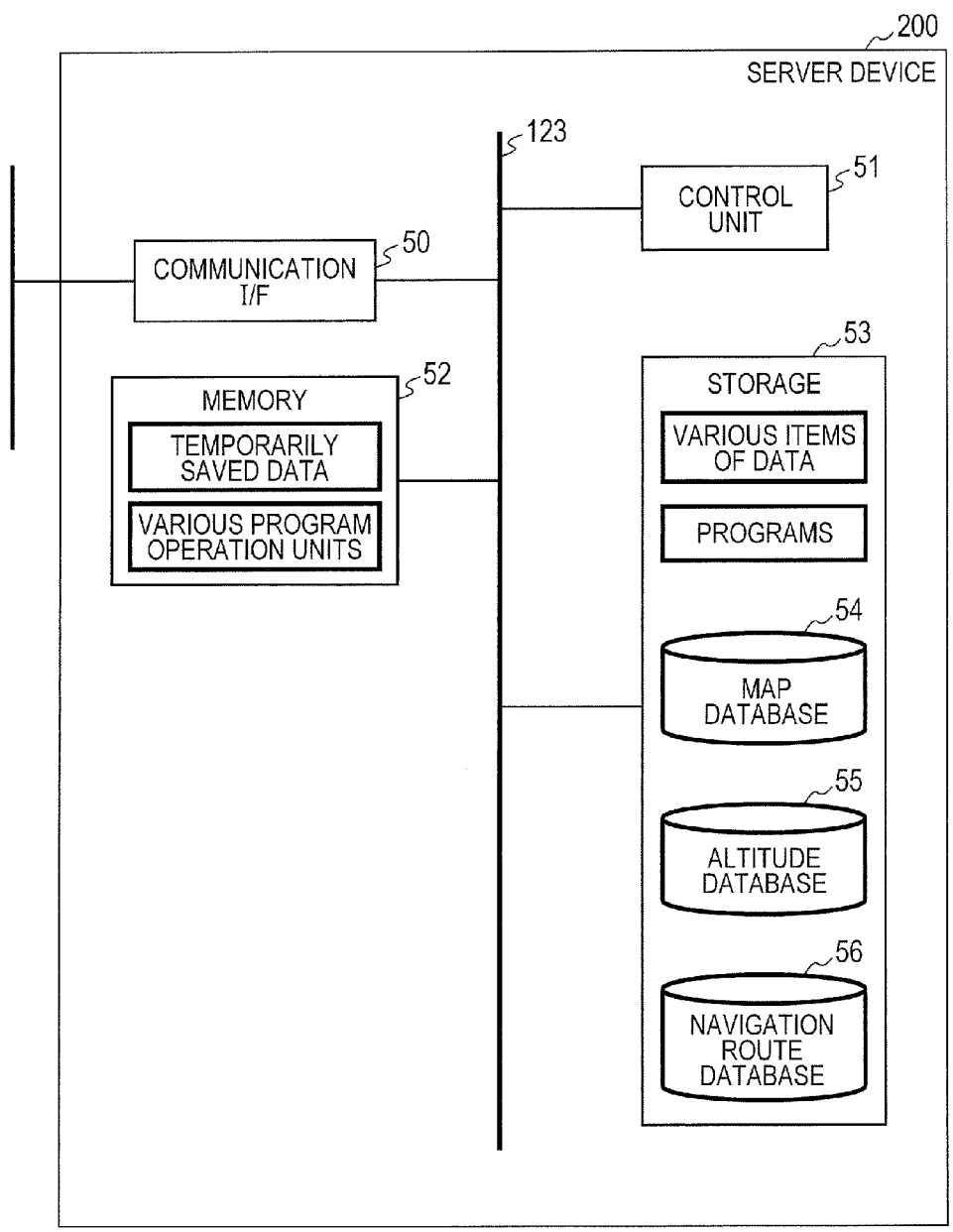
FIG. 9B is an example of a block diagram of a server device according to the second embodiment.

Since the configurations of the units of the wireless terminal 100 may be similar as in the first embodiment, the description is omitted Server Device FIG. 9B is an example of a block diagram of the server device 200.

The server device 200 is configured of a communication I/F 50, a control unit 51, a memory 52, and a storage 53, for example, and the processing units are connected to each other through a bus 123.

In the server device 200 in the embodiment, a navigation route database 56 is additionally provided on the storage 53 in FIG. 1C.

The control unit 51 includes a function in which the control unit 51 searches data stored on the navigation route database 56 of the storage 53 for a navigation route from a user's present position to a destination partner position (in the following, noted as a destination position), generates route navigation information, and delivers the route navigation information to the wireless terminal 100 via the external network 20 or the communication network through the communication I/F 50.

The navigation route database 56 is a navigation route data storage section that stores a navigation route from a user's present position to a destination position. Moreover, although navigation route data is stored in advance on the navigation route database 56, the latest navigation route data may be downloaded through the external network 20 for updating the navigation route database 56.

Software Configuration

Figure 10A:
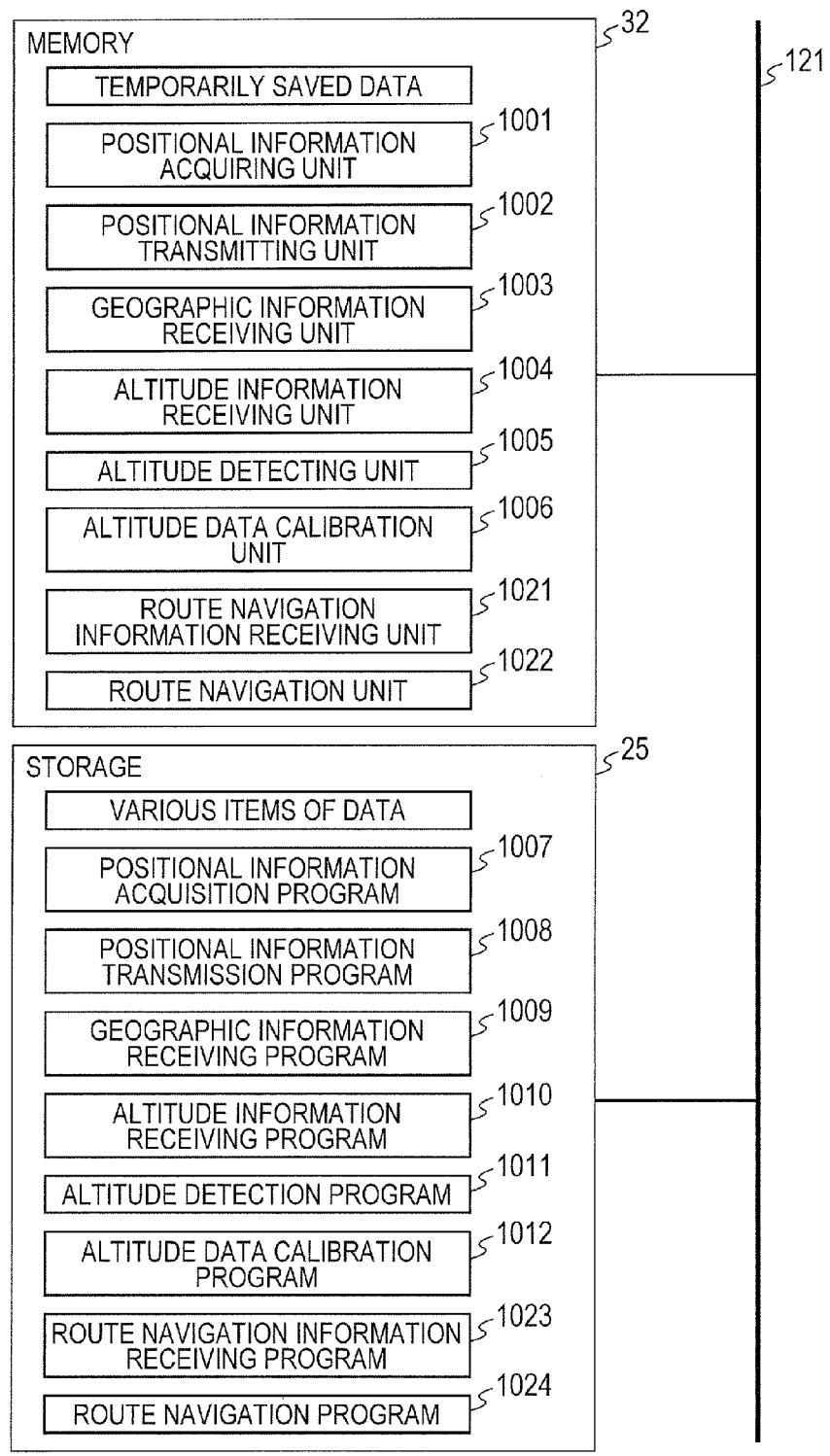
FIG. 10A is an example of an illustration of information on a memory and a storage of a wireless terminal according to the second embodiment.

FIG. 10A is an illustration of the functions of a positional information acquisition program, a positional information transmission program, a geographic information receiving program, an altitude information receiving program, an altitude detection program, an altitude data calibration program, a route navigation information receiving program, and a route navigation program of the wireless terminal 100.

In FIG. 10A, a storage 25 and a memory 32 are shown in the configuration of the wireless terminal 100.

A route navigation information receiving program 1023 and a route navigation program 1024 are additionally provided on the storage 25 in FIG. 2A in the first embodiment. A route navigation information receiving unit 1021 and a route navigation unit 1022 are additionally provided on the memory 32.

In FIG. 10A, the storage 25 stores the route navigation information receiving program 1023 and the route navigation program 1024. The control unit 14 expands the route navigation information receiving program 1023 and the route navigation program 1024 on the memory 32 as the route navigation information receiving unit 1021 and the route navigation unit 1022, and the control unit 14 executes the programs, so that various functions can be implemented. The route navigation information receiving program 1023 and the route navigation program 1024 may be stored on the storage 25 at a point in time when a product is shipped, or may be downloaded through a communication I/F 13 or a mobile communication I/F 31.

The route navigation information receiving unit 1021 acquires route navigation information from the server device 200 via the external network 20 through the communication I/F 13, or via the base station 30 through the mobile communication I/F 31. The route navigation information is information indicating a route from a present position to a destination position based on destination positional information about the positional information transmitter 300 and present positional information about the wireless terminal 100 acquired at the server device 200.

The route navigation unit 1022 displays a display screen for the user's present position, the navigation route, and map data on a display unit 17 based on the route navigation information acquired from the server device 200. Moreover, the present positional information, the destination positional information, and the navigation route may be updated anytime in association with the movement of the user.

Figure 10B:
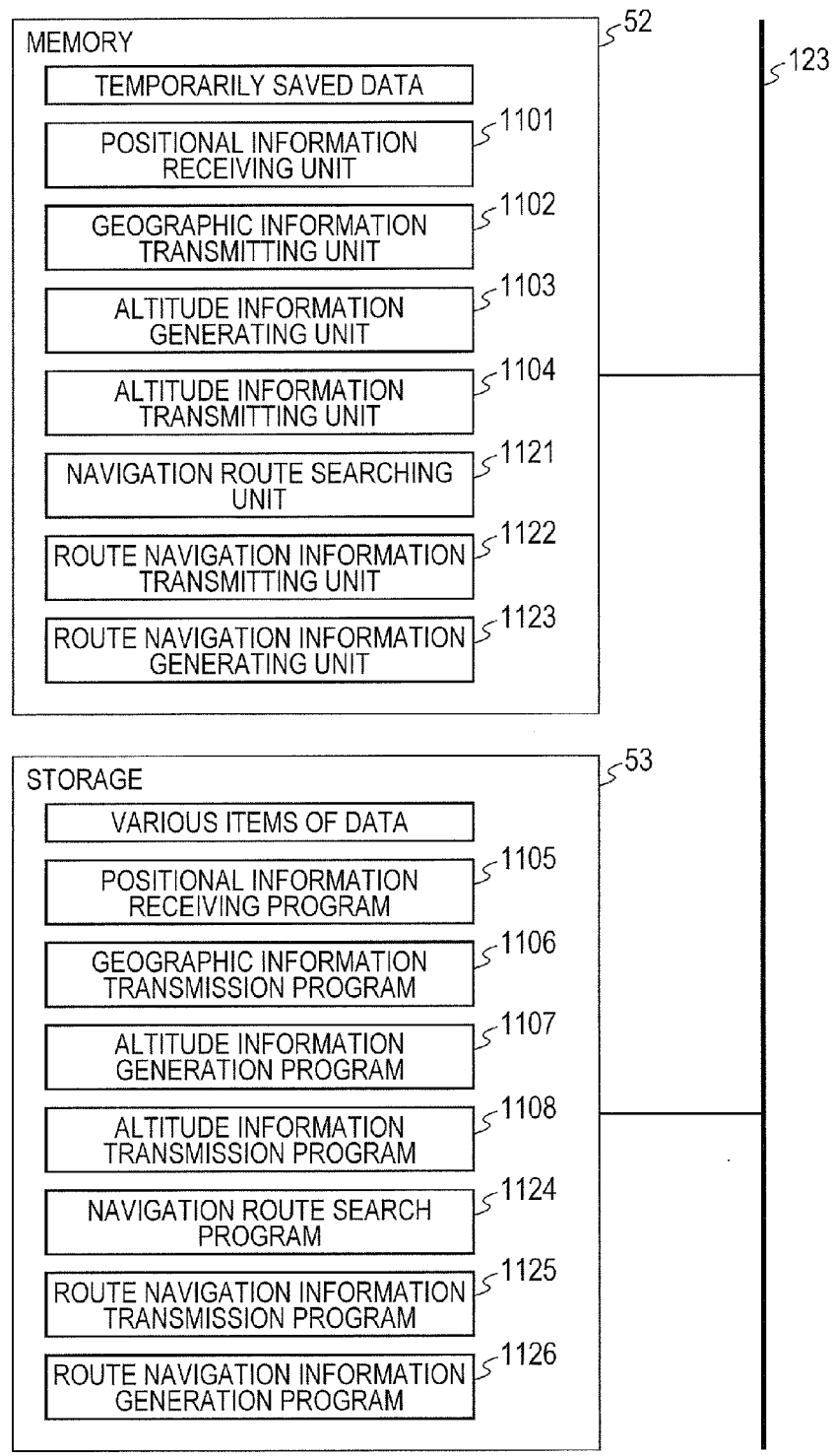
FIG. 10B is an example of an illustration of information on a memory and a storage of the server device according to the second embodiment.

FIG. 10B is an illustration of the functions of a positional information receiving program, a geographic information transmission program, an altitude information generation program, an altitude information transmission program, a navigation route search program, a route navigation information transmission program, and a route navigation information generation program of the server device 200.

In FIG. 10B, the storage 53 and the memory 52 are shown in the configuration of the server device 200.

A navigation route search program 1124, a route navigation information transmission program 1125, and a route navigation information generation program 1126 are additionally provided on the storage 53 in FIG. 2B in the first embodiment. A navigation route searching unit 1121, a route navigation information transmitting unit 1122, and a route navigation information generating unit 1123 are additionally provided on the memory 52.

In FIG. 10B, the storage 53 stores the navigation route search program 1124, the route navigation information transmission program 1125, and the route navigation information generation program 1126. The navigation route search program 1124, the route navigation information transmission program 1125, and the route navigation information generation program 1126 are expanded on the memory 52 as the navigation route searching unit 1121, the route navigation information transmitting unit 1122, and the route navigation information generating unit 1123, and the control unit 51 executes the programs, so that various functions can be implemented. The navigation route search program 1124, the route navigation information transmission program 1125, and the route navigation information generation program 1126 can be stored in advance from an external storage or the like.

The navigation route searching unit 1121 searches data stored on the navigation route database 56 for a navigation route from a user's present position to a destination position.

The route navigation information generating unit 1123 generates route navigation information based on the result searched at the navigation route searching unit 1121.

The route navigation information transmitting unit 1122 transmits the route navigation information generated at the route navigation information generating unit 1123 to the wireless terminal 100 via the external network 20 or the base station 30 through the communication I/F 50.

Operation Sequence

Figure 11A:
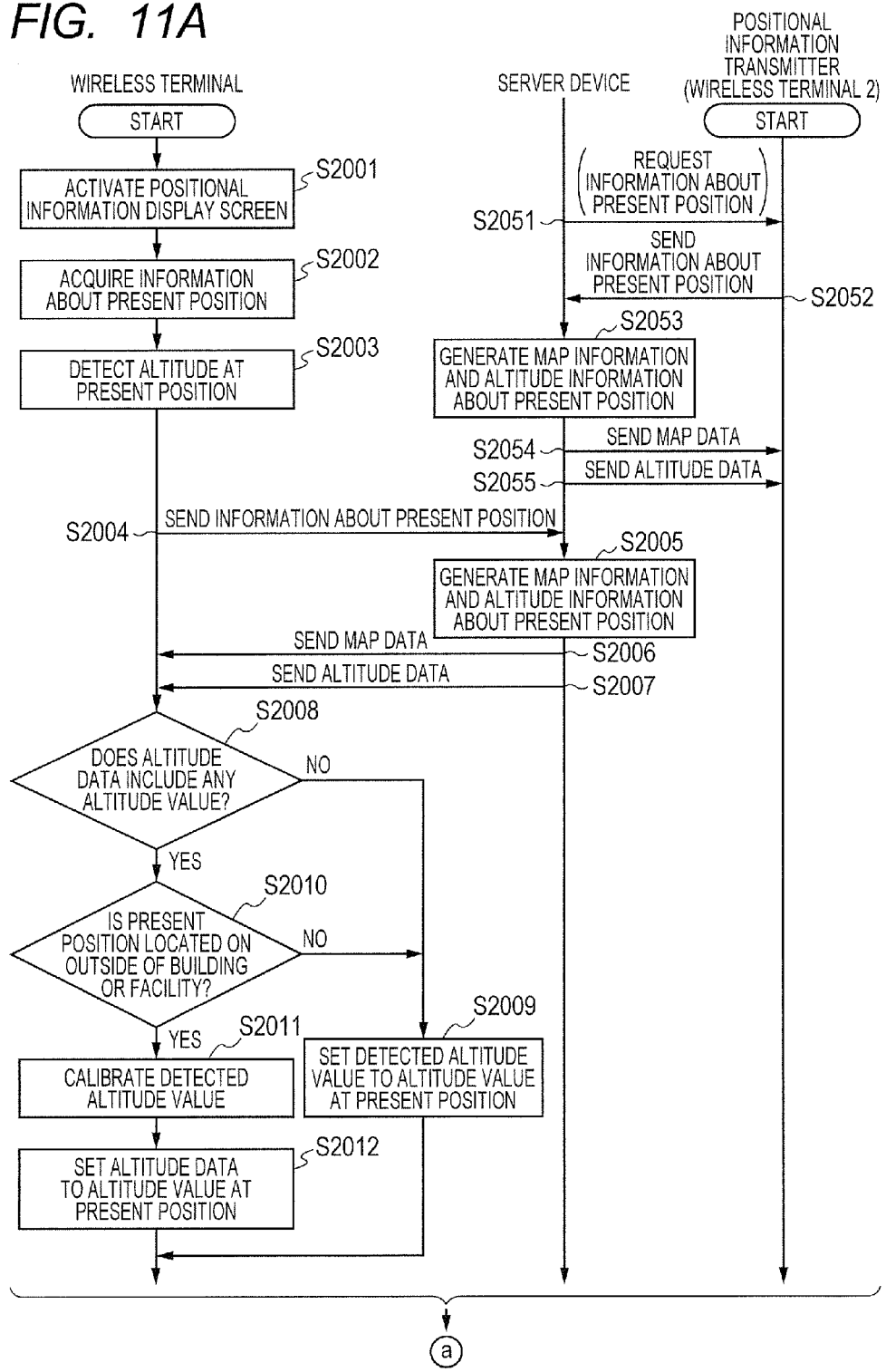
FIG. 11A is a diagram of an exemplary modification of an operation sequence of the navigation system according to the second embodiment.
Figure 11B:
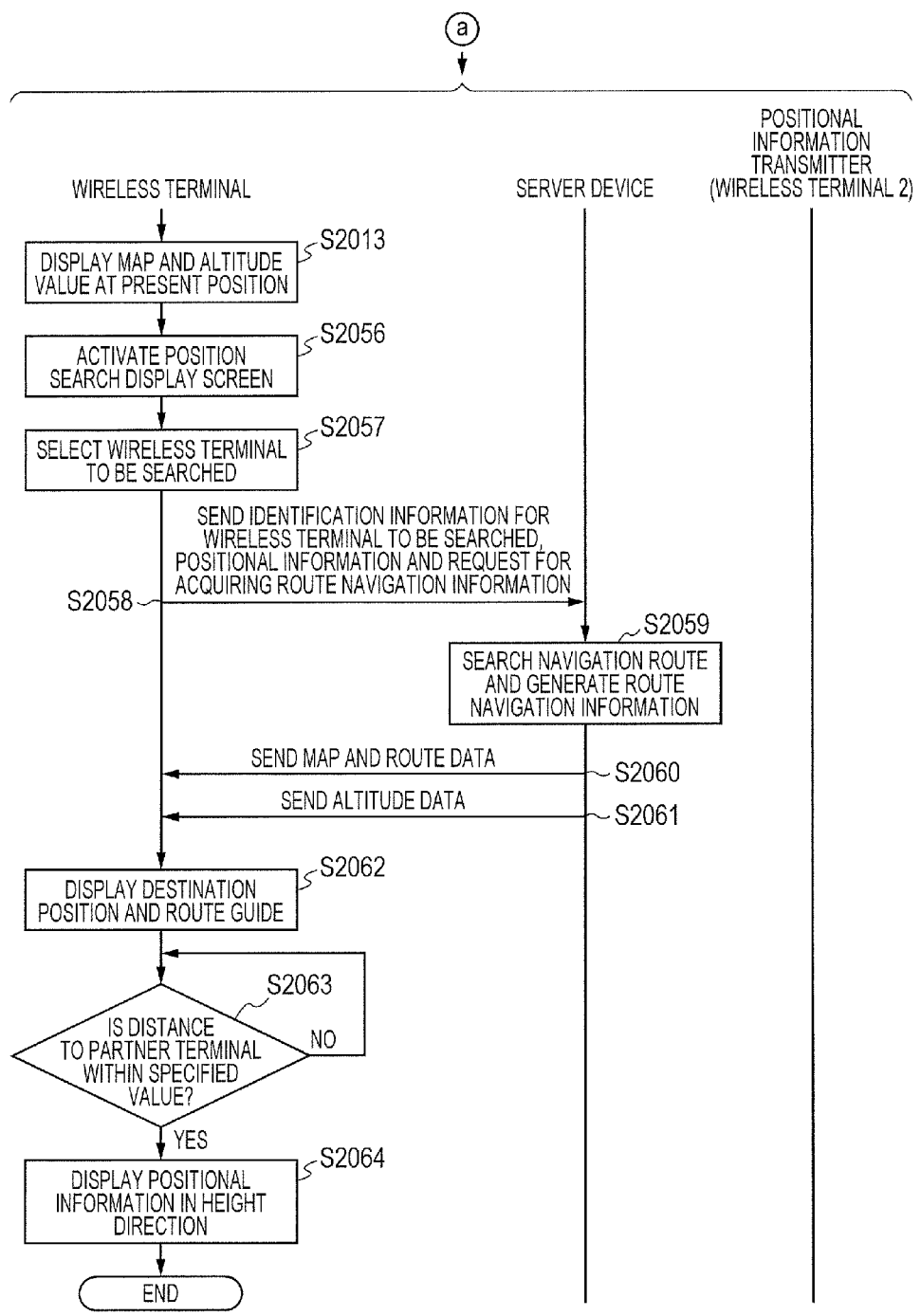
FIG. 11B is a diagram of an exemplary modification of an operation sequence of the navigation system according to the second embodiment.

FIGS. 11A and 11B are diagrams of an exemplary modification of the operation sequence of the navigation system according to the second embodiment.

Steps 2051 to 2064 are additionally provided on FIG. 3A. It is noted that FIGS. 11A and 11B form a single operation sequence as combined together.

In FIGS. 11A and 11B, the server device 200 makes a request for present positional information to the positional information transmitter 300 on a regular basis (S2051), and the positional information transmitter 300 transmits present positional information to the server device 200 (S2052). The control unit 51 of the server device 200 generates geographic information and altitude information from the map database 54 and the altitude database 55 based on the received present positional information (S2053). Moreover, the control unit 51 transmits the map data and the altitude data to the positional information transmitter 300 via the external network 20 or the base station 30 as necessary (S2054 and S2055).

In the following, since Steps 2001 to 2013 are the same as in the description in FIG. 3A, the description is omitted.

The control unit 14 of the wireless terminal 100 receives an instruction to activate a position search display screen from the input section 15, and then activates the position search display screen (S2056).

Subsequently, when a positional information transmitter (a wireless terminal 2) 300 to be searched is selected on a searched terminal select display screen displayed on the display unit 17 through the input section 15 (S2057), the control unit 14 transmits identification information about the transmitter (the wireless terminal 2) 300 to be searched, positional information, and a request for acquiring route navigation information to the server device 200 via the external network 20 or the base station 30 through the communication I/F 13 or the mobile communication I/F 31 (S2058).

Subsequently, the control unit 51 of the server device 200 instructs the navigation route searching unit 1121 to search for a route based on the identification information and the positional information about the positional information transmitter (the wireless terminal 2) 300 received from the wireless terminal 100, and the navigation route searching unit 1121 searches the navigation route database 56 for a navigation route. The route navigation information generating unit 1123 acquires the navigation route from the navigation route searching unit 1121, and delivers route data to the route navigation information transmitting unit 1122 (S2059). The control unit 51 transmits map data, route data, and altitude data to the wireless terminal 100 from the geographic information transmitting unit 1102, the route navigation information transmitting unit 1122, and the altitude information transmitting unit 1104, respectively, via the external network 20 or the base station 30 (S2060 and S2061).

Subsequently, the control unit 14 of the wireless terminal 100 displays the map data, the route data, and the altitude data received from the server device 200 on the display unit 17 (S2062).

Here, in the case where a distance between the wireless terminal 100 and the positional information transmitter (the wireless terminal 2) 300 is within a specified value (S2063: YES), a moving direction in the height direction is displayed near the display position of the positional information transmitter (the wireless terminal 2) 300, which is a destination position (S2064). A distance between the wireless terminal 100 and the positional information transmitter (the wireless terminal 2) 300 may be determined at the wireless terminal 100, or the result determined at the server device 200 may be transmitted to the wireless terminal 100 in Step 2059. It is noted that in the case where a distance between the wireless terminal 100 and the positional information transmitter (the wireless terminal 2) 300 is not within a specified value (S2063: NO), determination is repeated until a distance falls within a specified value.

Moreover, in the embodiment, Step 2010 may be replaced by Step 2050A shown in FIG. 3B. In this case, Step 2050 shown in FIG. 3B is additionally provided subsequent to Step 2001, and an altitude value can be acquired as similar to the operation flow in FIG. 3B.

Exemplary Display Screens

Next, exemplary display screens will be described in the case where the input section 15 of the wireless terminal 100 accepts a manipulation from the user and route navigation information is displayed on the wireless terminal 100.

Figure 12:
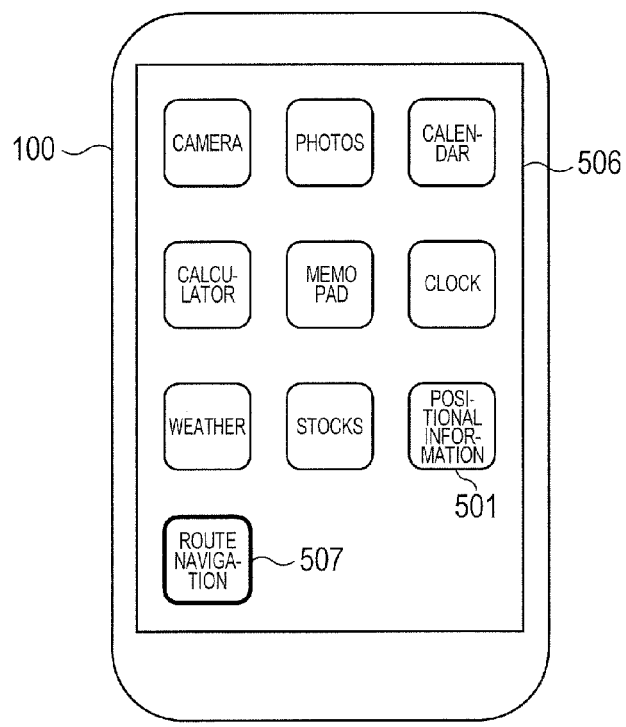
FIG. 12 is an exemplary display of a menu screen of the wireless terminal according to the second embodiment.

FIG. 12 is an exemplary display of a menu screen of the wireless terminal 100.

Figure 13:
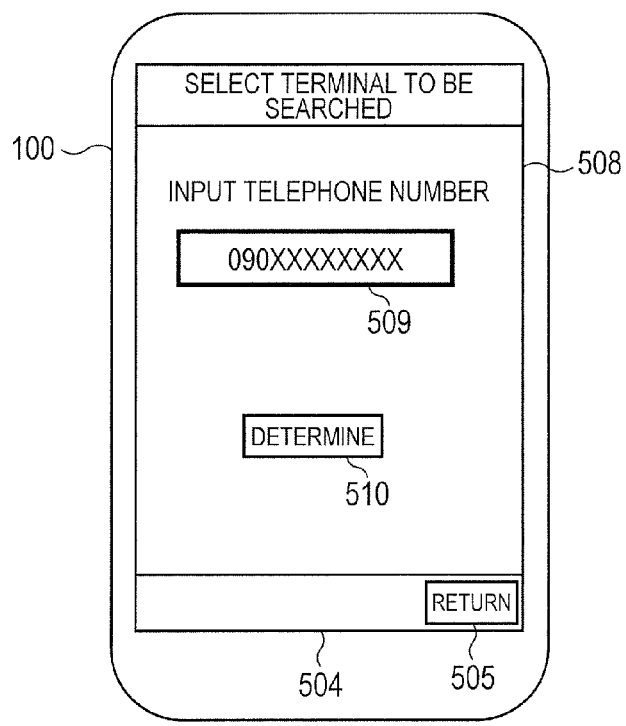
FIG. 13 is an exemplary display of a searched terminal select screen.

In FIG. 12, when a route navigation 507 is tapped, a searched terminal select display screen 508 as shown in FIG. 13 is displayed on the display unit 17 of the wireless terminal 100 according to the operation sequence shown in FIGS. 11A and 11B.

FIG. 13 is an exemplary display of the searched terminal select display screen 508.

The searched terminal select display screen 508 is a display screen that selects the positional information transmitter (the wireless terminal 2) 300 to be searched.

Figure 14:
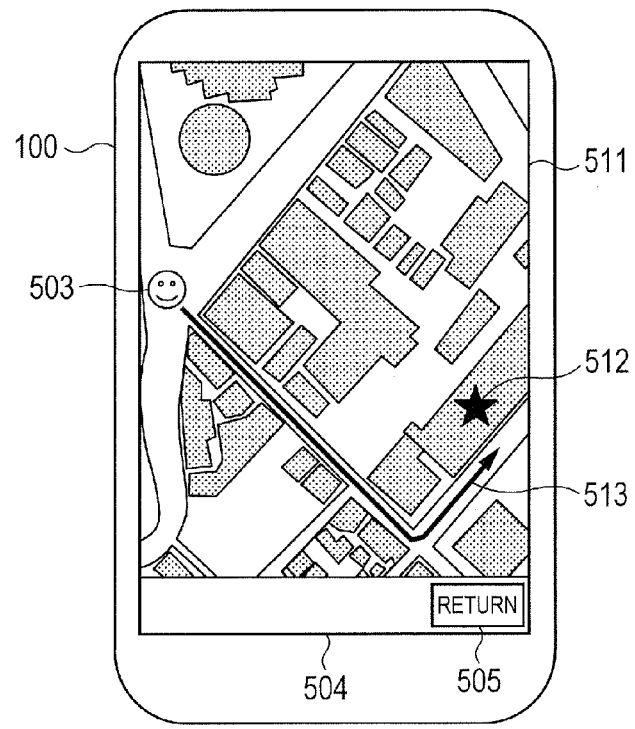
FIG. 14 is an exemplary display of a route navigation screen.

The control unit 14 receives a user manipulation through the input section 15, confirms a telephone number in response to tapping a determination button 510 based on the telephone number inputted to a telephone number input portion 509, and then displays a route navigation screen 511 shown in FIG. 14. In the embodiment, a terminal to be searched is specified by a telephone number. However, a nickname associated with a telephone number or the like may be selected.

FIG. 14 is an exemplary display of a route navigation screen.

The route navigation indication screen 511 is configured of a map, a user's present position 503, a destination position 512, a navigation route 513 from a present position to a destination position, and a navigation indication 504, for example. The present position 503 and the navigation route 513 are updated according to the movement of the user.

Figure 15:
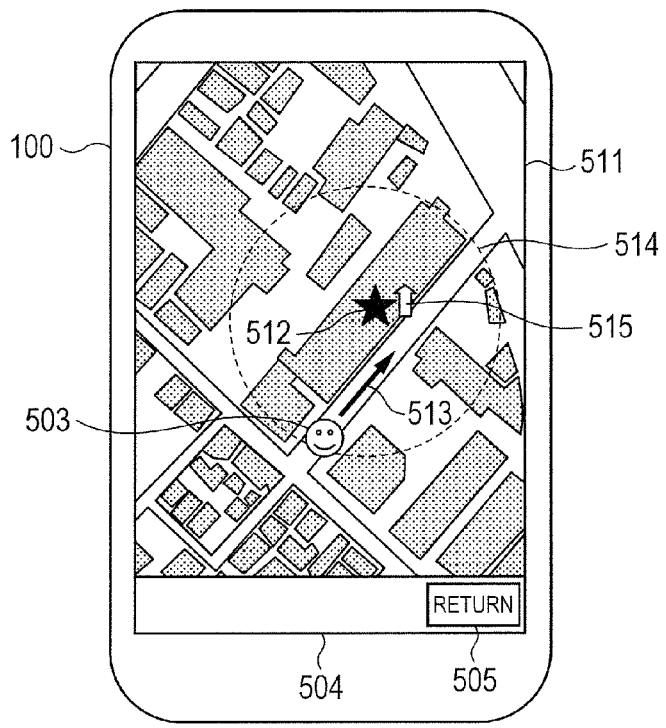
FIG. 15 is an exemplary display of a route navigation screen in the case where a user is coming in a predetermined range of a destination position.

FIG. 15 is an exemplary display of a route navigation screen in the case where the user is coming in a predetermined range of a destination position.

A broken line circle 514 indicating a predetermined range shows the position relationship between the user and the destination position, and is not actually displayed on the display unit 17.

In FIG. 15, when the user's present position comes close to the destination position and enters a predetermined region of the broken line circle 514, a height direction indication 515 is displayed near the destination position 512. The height direction indication 515 is an indication that compares the altitude data of the user's present position 503 with the altitude data of the destination position 512 and shows the position relationship between the altitude data of the user's present position 503 and the altitude data of the destination position 512. In the embodiment, since the height direction indication 515 is directed upward, this shows that the destination position is located at a position higher than the user's present position. Moreover, the shape and size (the length of an arrow in the embodiment) of the height direction indication 515 may be changed according to the difference between the altitude data of the user's present position 503 and the altitude data of the destination position 512.

Here, altitude data at the present position where the user exists indicates that the present position is located on the outside of a building, and the data uses an altitude value based on altitude data by aerial laser measurement or the like. Moreover, the altitude data of the destination position indicates that the present position is located on the inside of a building, and the data uses an altitude value based on the detected altitude data calculated from an atmospheric pressure measured at the atmospheric pressure sensor unit 37 because it is difficult to use altitude data.

As described above, a change in the atmospheric pressure caused by a change in an environment such as weather is hardly affected, altitude data can be highly accurately known even on the outside or on the inside of a building or facility, and the user can be navigated to a destination point even though the destination position is a story in the inside of a building.

Third Embodiment

In the following, a third embodiment of the present invention will be described with reference to FIGS. 1A to 3B and FIGS. 16 to 19.

It is noted that in the embodiment, a comparison will be made with the first embodiment, and different points will be emphasized and described.

System Configuration

Figure 16:
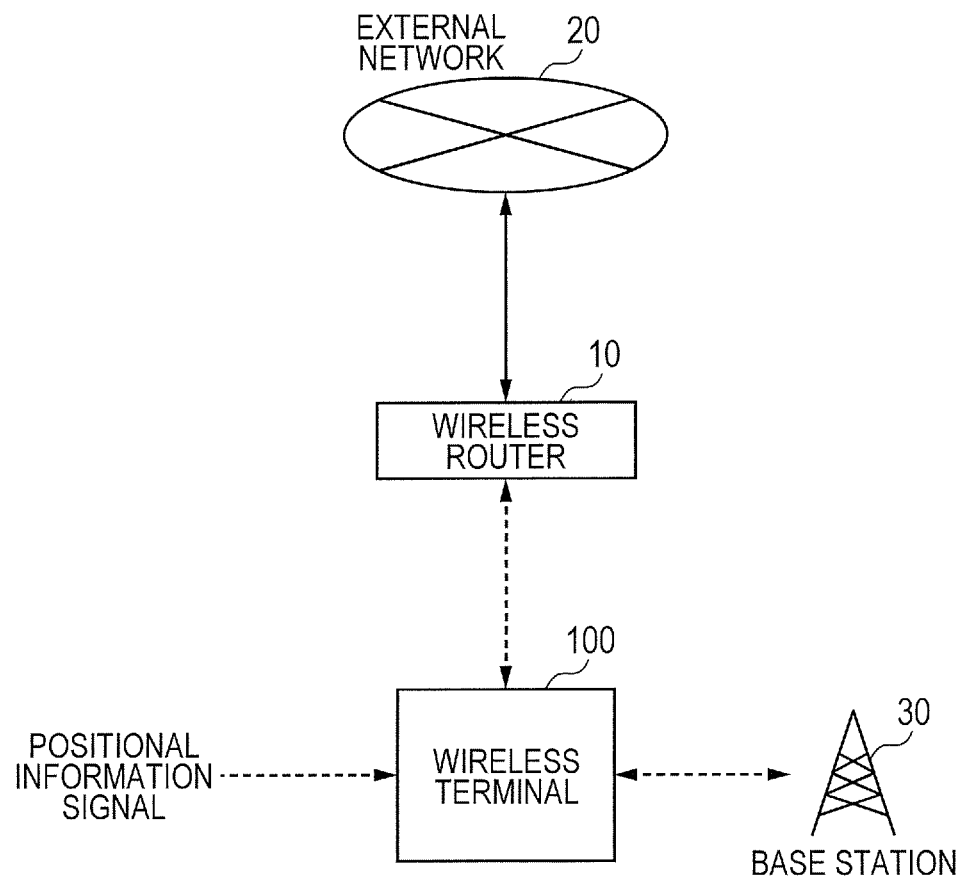
FIG. 16 is a block diagram of an exemplary wireless terminal including a positional information providing function or a navigation function according to a third embodiment.

FIG. 16 is a block diagram of an embodiment of a wireless terminal including a positional information providing function or a navigation function according to the third embodiment.

The wireless terminal according to the embodiment can be operated alone instead of the server device 200 in FIG. 1A in the first embodiment.

A wireless terminal 100 can acquire positional information or the like about a wireless terminal to be searched from a communication provider through a base station 30 using a mobile communication network. Moreover, the wireless terminal 100 can be connected to an external network 20 through a wireless router 10, and can acquire information through an Internet network as well.

Wireless Terminal

Figure 17:
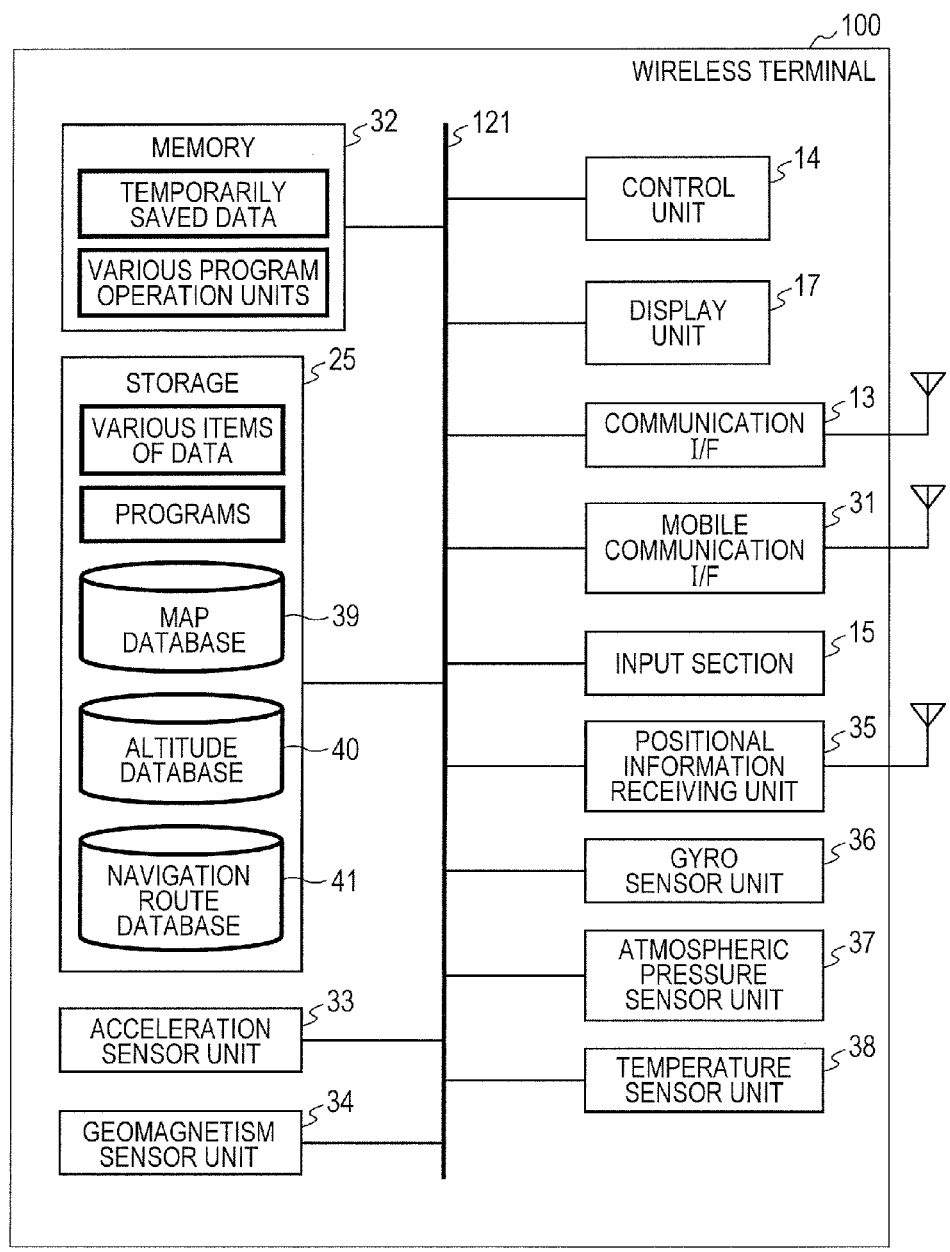
FIG. 17 is an example of a block diagram of the wireless terminal according to the third embodiment.

FIG. 17 is an example of a block diagram of the wireless terminal according to the third embodiment.

In FIG. 17, in the wireless terminal 100, a map database 39, an altitude database 40, and a navigation route database 41 are additionally provided on a storage 25 with respect to the first embodiment.

A control unit 14 receives a user manipulation request through an input section 15, and controls various program operation units. Moreover, the control unit 14 also includes a function in which the control unit 14 acquires map data, altitude data, or navigation route data stored on the map database 39, the altitude database 40, and the navigation route database 41 of the storage 25 and delivers the data to various program operation units.

The map database 39 is a map data storage section that stores map data. The map data also includes the shape data of buildings, facilities, and the like displayed on a map. Furthermore, although map data is stored on the map database 39 in advance, the latest map data may be downloaded from a server that provides the latest map through the external network 20 for updating the map database 39.

The altitude database 40 is an altitude data storage section that stores altitude data corresponding to the map data of the map database 39. For the altitude data, such a value is used, for example, in which artificial structures such as houses, elevated structures, and bridges and vegetation such as trees are removed by filtering, for example, from altitude data acquired by aerial laser scanner measurement for interpolation at a predetermined interval and the value is found. Moreover, although altitude data is stored on the altitude database 40 in advance, the latest altitude data may be downloaded from a server that provides the latest map (altitude), for example, through the external network 20 for updating the altitude database 40.

The navigation route database 41 is a navigation route data storage section that stores a navigation route from a user's present position to a destination position. Furthermore, although navigation route data is stored in advance on the navigation route database 41, the latest navigation route data may be downloaded through the external network 20 for updating the navigation route database 41.

In the following, since the functions of the units other than the description above are the same as in the first embodiment, the description is omitted.

Software Configuration

Figure 18:
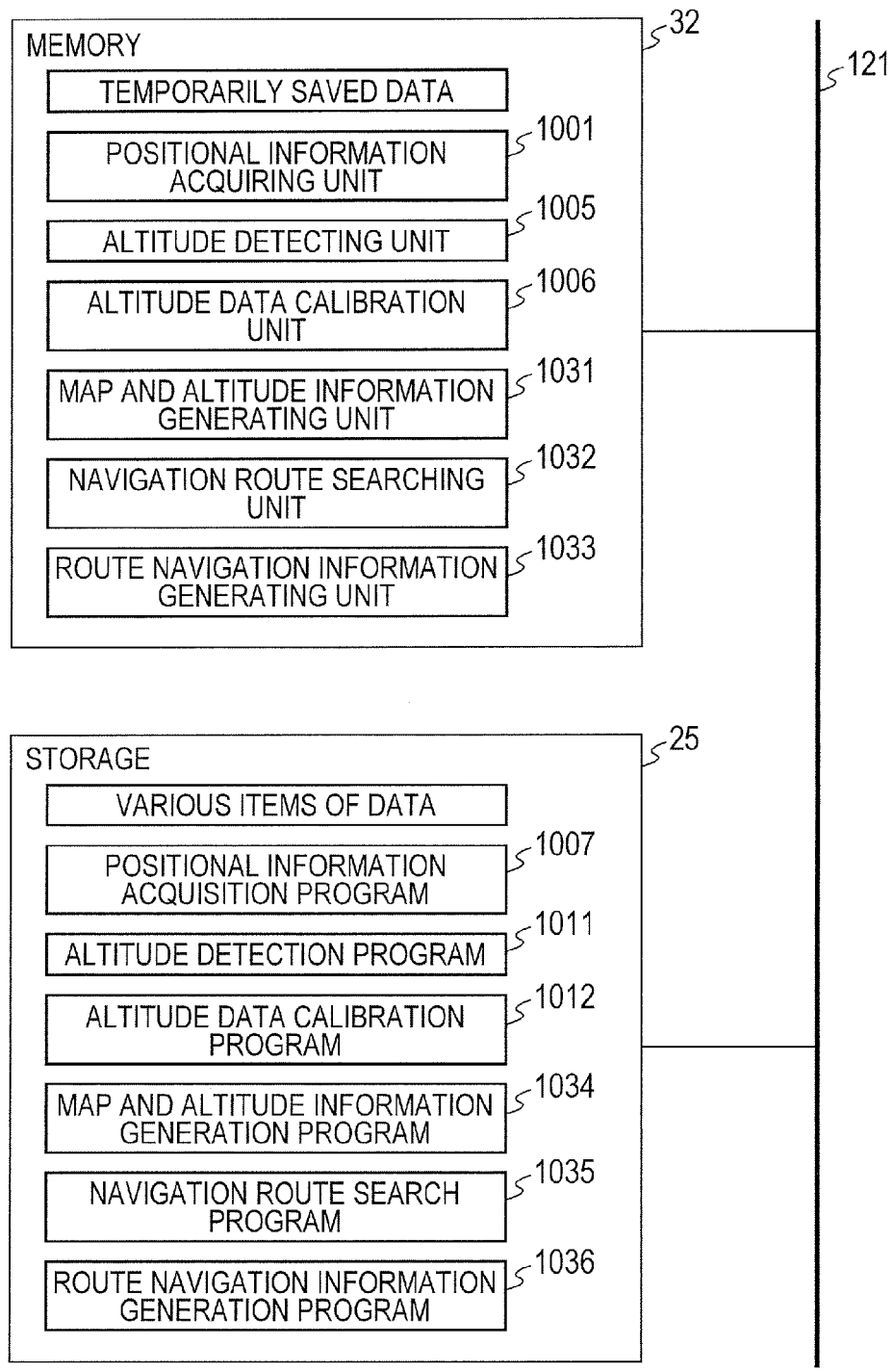
FIG. 18 is an example of an illustration of information on a memory and a storage of the wireless terminal according to the third embodiment.

FIG. 18 is an illustration of the functions of a positional information acquisition program, an altitude detection program, an altitude data calibration program, a map and altitude information generation program, a navigation route search program, and a route navigation information generation program of the wireless terminal 100.

In FIG. 18, the storage 25 and a memory 32 are shown in the configuration of the wireless terminal 100.

A map and altitude information generation program 1034, a navigation route search program 1035, and a route navigation information generation program 1036 are additionally provided on the storage 25 instead of the positional information transmission program 1008, the geographic information receiving program 1009, and the altitude information receiving program 1010 in FIG. 2A in the first embodiment. A map and altitude information generating unit 1031, a navigation route searching unit 1032, and a route navigation information generating unit 1033 are additionally provided on the memory 32, instead of the positional information transmitting unit 1002, the geographic information receiving unit 1003, and the altitude information receiving unit 1004.

In FIG. 18, the storage 25 stores the map and altitude information generation program 1034, the navigation route search program 1035, and the route navigation information generation program 1036. The map and altitude information generation program 1034, the navigation route search program 1035, and the route navigation information generation program 1036 are expanded on the memory 32 as the map and altitude information generating unit 1031, the navigation route searching unit 1032, and the route navigation information generating unit 1033, and the control unit 14 executes the programs, so that various functions can be implemented. The map and altitude information generation program 1034, the navigation route search program 1035, and the route navigation information generation program 1036 may be stored on the storage 25 at a point in time when a product is shipped, or may be downloaded through a communication I/F 13 or a mobile communication I/F 31.

The map and altitude information generating unit 1031 acquires map data including the present positional information on the center from the map database 39 based on the positional information acquired from a positional information receiving unit 35, acquires altitude data corresponding to the map data from the altitude database 40, and delivers the map data and the altitude data to the control unit 14. The control unit 14 displays the map data and the altitude data received from the map and altitude information generating unit 1031 on a display unit 17.

The navigation route searching unit 1032 searches data stored on the navigation route database 41 for a navigation route from a user's present position to a destination position.

The route navigation information generating unit 1033 generates route navigation information based on the result searched at the navigation route searching unit 1032.

Operation Sequence

Figure 19A:
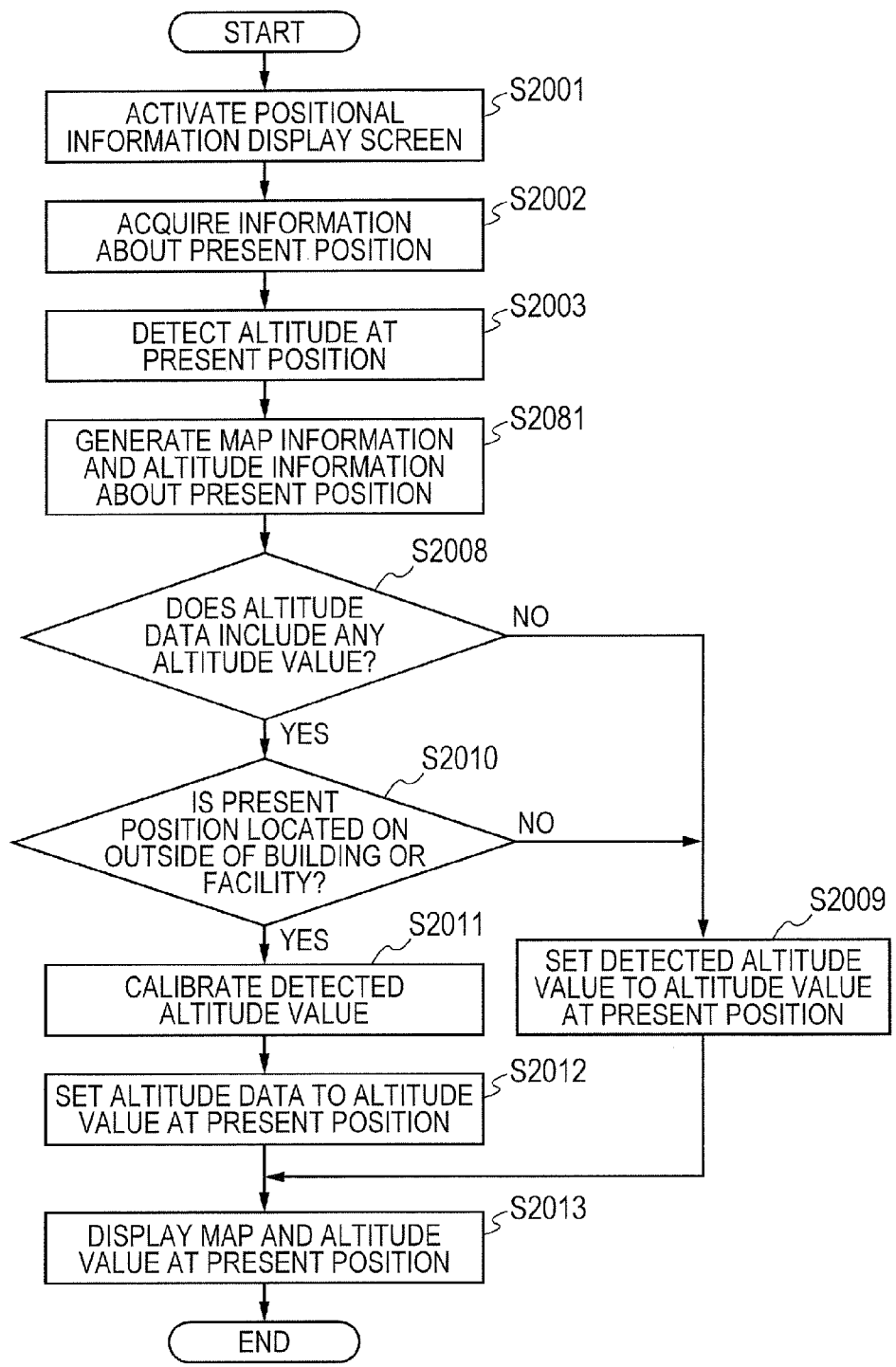
FIG. 19A is an operation sequence diagram of an exemplary process of the wireless terminal including a positional information providing function according to the third embodiment.

FIG. 19A is an operation sequence diagram of an exemplary process of the wireless terminal including a positional information providing function according to the third embodiment.

Step 2081 is additionally provided instead of Steps 2004 to 2007 in FIG. 3A in the first embodiment.

In FIG. 3A, the server device 200 generates a map or altitude information about the present position. However, in the third embodiment, the wireless terminal 100 generates a map or altitude information about the present position.

In FIG. 19A, the control unit 14 of the wireless terminal 100 receives an instruction to activate a positional information display screen from the input section 15, and then activates the positional information display screen (S2001). A positional information acquiring unit 1001 acquires positional information calculated from positional information signals including latitude and longitude, for example, and received at the positional information receiving unit 35 (S2002).

An altitude detecting unit 1005 calculates altitude information based on an atmospheric pressure measured at an atmospheric pressure sensor unit 37 (S2003), and temporarily saves the altitude information as an altitude value at the present position on the memory 32.

The map and altitude information generating unit 1031 generates geographic information and altitude information from the map database 39 and the altitude database 40 based on the present positional information acquired at the positional information acquiring unit 1001 (S2081).

In the following, since Steps 2008 to 2013 are the same as in FIG. 3A, the description is omitted.

Figure 19B:
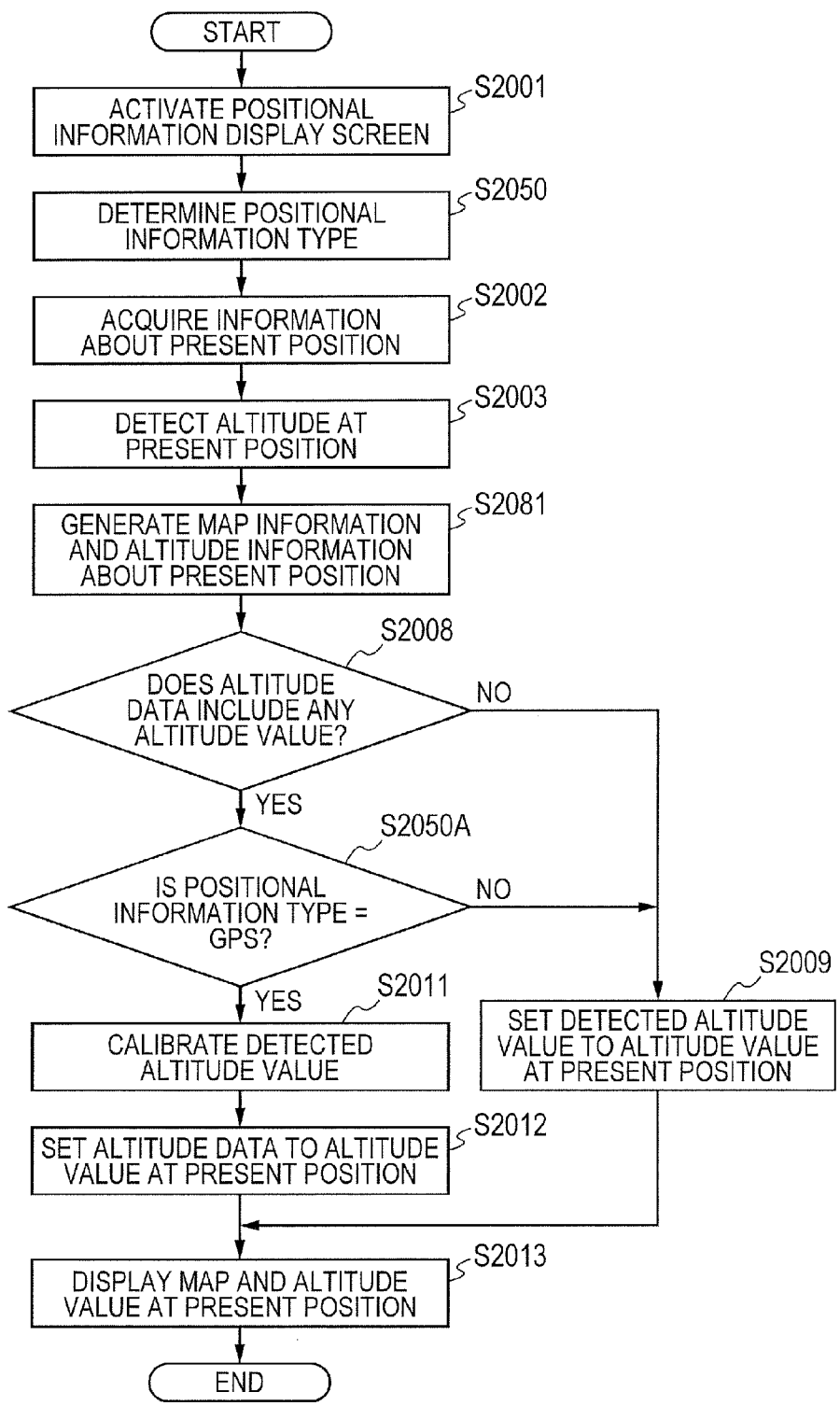
FIG. 19B is a diagram of an exemplary modification of an operation sequence of the wireless terminal including a positional information providing function according to the third embodiment.

FIG. 19B is a diagram of an exemplary modification of the operation sequence of the wireless terminal including a positional information providing function according to the third embodiment.

Step 2081 is additionally provided instead of Steps 2004 to 2007 in FIG. 3B in the first embodiment.

In FIG. 3B, the server device 200 generates a map or altitude information about the present position. However, in FIG. 19B, the wireless terminal 1001 generates a map or altitude information about the present position as similar in FIG. 19A.

In FIG. 19B, the control unit 14 of the wireless terminal 100 receives an instruction to activate a positional information display screen from the input section 15, and then activates the positional information display screen (S2001). The positional information acquiring unit 1001 acquires type information indicating types of positioning modes from positional information signals received at the positional information receiving unit 35 (S2050), and temporarily saves the positional information types on the memory 32. Moreover, the positional information acquiring unit 1001 acquires positional information calculated from the positional information signals received at the positional information receiving unit 35 (S2002).

The altitude detecting unit 1005 calculates altitude information based on an atmospheric pressure measured at the atmospheric pressure sensor unit 37 (S2003), and temporarily saves the altitude information as an altitude value at the present position on the memory 32.

The map and altitude information generating unit 1031 generates geographic information and altitude information from the map database 39 and the altitude database 40 based on the present positional information acquired at the positional information acquiring unit 1001 (S2081).

In the following, since Steps 2008 to 2009, Step 2050A, and Steps 2011 to 2013 are the same as in FIG. 3B, the description is omitted.

Figure 19C:
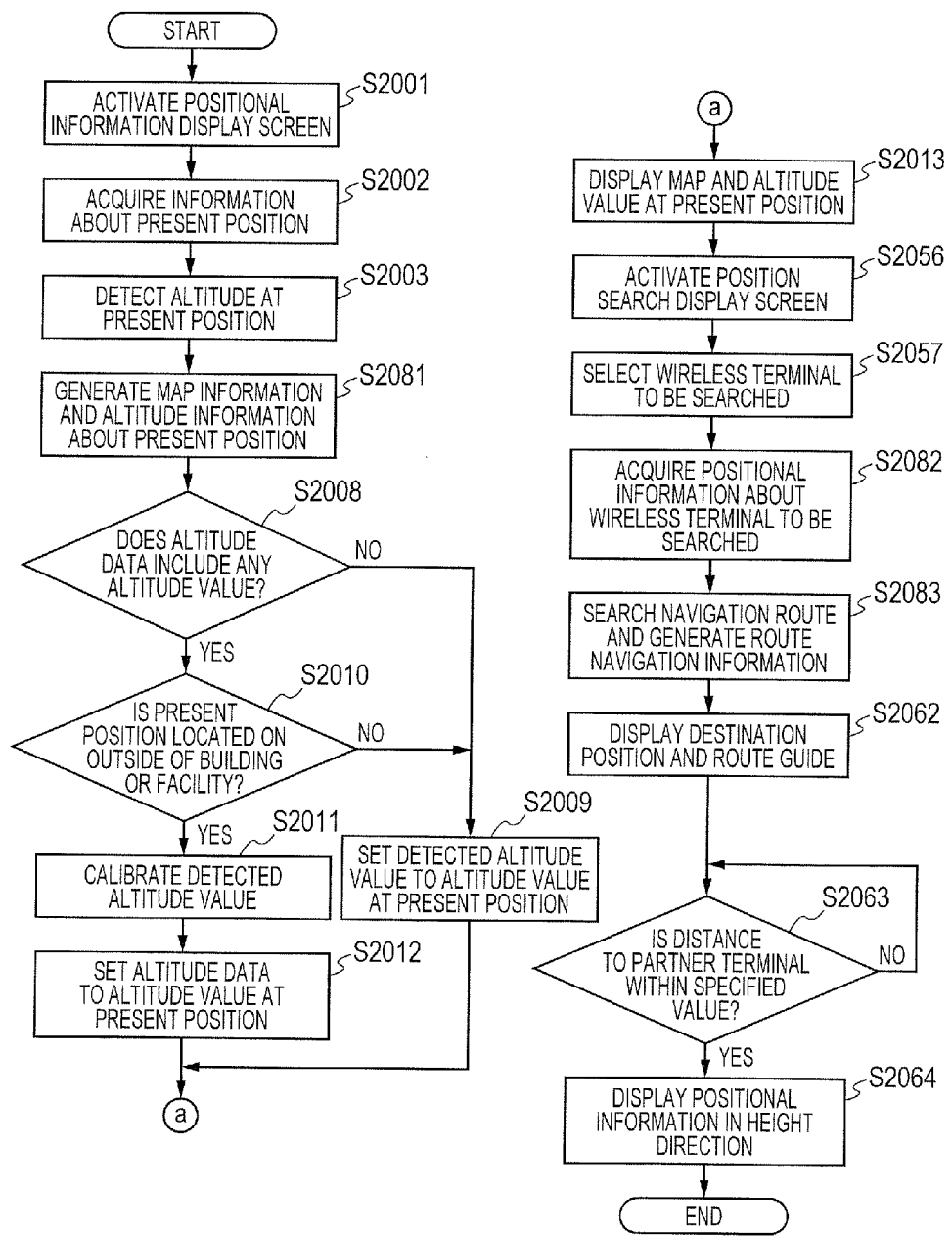
FIG. 19C is an operation sequence diagram of an exemplary process of the wireless terminal including a navigation function according to the third embodiment.

FIG. 19C is an operation sequence diagram of an exemplary process of the wireless terminal including a navigation function according to the third embodiment.

Step 2081 is additionally provided instead of Steps 2004 to 2007 in FIGS. 11A and 11B in the second embodiment. Moreover, Steps 2082 and 2083 are additionally provided instead of Steps 2058 to 2061. Furthermore, Steps 2051 to 2055 in FIG. 11A are unnecessary. This is because positional information about a wireless terminal to be searched is acquired from a mobile communication provider via the external network 20 or the base station 30 through the communication I/F 13 or the mobile communication I/F 31.

Moreover, in FIGS. 11A and 11B, the server device 200 generates geographic information, altitude information about the present position, and route navigation information. However, in FIG. 19C, the wireless terminal 100 generates these items of information.

In the following, in FIG. 19C, since Step 2081 and Steps 2001 to 2013 are the same as in FIG. 19A, the description is omitted.

The control unit 14 of the wireless terminal 100 receives an instruction to activate a position search display screen from the input section 15, and then activates the position search display screen (S2056).

Subsequently, when a wireless terminal to be searched is selected on a searched terminal select display screen displayed on the display unit 17 through the input section 15 (S2057), the control unit 14 acquires positional information about the wireless terminal to be searched (not shown) from the mobile communication provider via the external network 20 or the base station 30 through the communication I/F 13 or the mobile communication I/F 31 (S2082).

Subsequently, the control unit 14 instructs the navigation route searching unit 1032 to search for a route, the navigation route searching unit 1032 searches the navigation route database 41 for a navigation route based on the positional information about the wireless terminal to be searched that is received from the mobile communication provider, and the route navigation information generating unit 1033 generates route navigation information (S2083). The control unit 14 displays map data, route data, and altitude data received from the route navigation information generating unit 1033 on the display unit 17 (S2062).

Here, in the case where a distance between the wireless terminal 100 and the wireless terminal to be searched is within a specified value (S2063: YES), the moving direction of the height direction is displayed near the display position of the wireless terminal to be searched, which is located at a destination position (S2064).

In the case where a distance between the wireless terminal 100 and the wireless terminal to be searched is not within a specified value (S2063: NO), determination is repeated until a distance falls within a specified value.

Moreover, in the embodiment, Step 2010 shown in FIG. 19C may be replaced by Step 2050A shown in FIG. 19B. In this case, Step 2050 shown in FIG. 19B is additionally provided subsequent to Step 2001, and an altitude value can be acquired as similar to the operation flow in FIG. 19B.

Exemplary Display Screens

For screen display according to the embodiment, since functions can be implemented as similar to the functions in FIGS. 7 and 8 in the first embodiment and FIGS. 12 to 15 in the second embodiment, the description is omitted.

As described above, a change in the atmospheric pressure caused by a change in an environment such as weather is hardly affected, altitude data can be highly accurately known even on the outside or on the inside of a building or facility, and the user can be navigated to a destination point even though the destination position is a story in the inside of a building.

It is noted that the present invention is not limited to the embodiments, and includes various exemplary modifications. For example, the embodiments describe the overall system in detail for easily understanding the present invention. The present invention is not necessarily limited to ones including all the configurations described above. Moreover, a part of the configuration of a certain embodiment can be replaced by the configuration of a different embodiment, and the configuration of a different embodiment can be added to the configuration of a certain embodiment. Furthermore, the configurations of the embodiments can be added to, deleted from, and replaced by the other configurations.

Moreover, the configurations, the functions, the processing units, and the like described above may be implemented by hardware by designing a part or all of them using an integrated circuit, for example. Furthermore, the configurations, the functions, and the like described above may be implemented by software in which a processor interprets and executes programs, the functions of which are implemented by the processor. Items of information such as programs, tables, and files that implement the functions may be stored on a recording device such as a memory, a hard disk, and an SSD (Solid State Drive), or stored on a recording medium such as an IC card, an SD card, and a DVD.

In addition, the programs described in examples of the processes may be separate programs, or a plurality of programs may configure a single application program.

Moreover, control lines and information lines that are necessary for description are shown, and all of control lines and information lines on a product are not always shown. It can also be considered that almost all of the configurations are actually connected to each otter.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A positional information providing system comprising:
a server device connected to a terminal device through a network, wherein:
the server device includes:
 a map data storage unit configured to store map data and story information including an altitude of each story of a structure in a position on the map data;
 a positional information receiving unit configured to receive positional information about the terminal device transmitted from the terminal device through the network; and
 a geographic information transmitting unit configured to transmit map data stored on the map data storage unit to the terminal device through the network; and
the terminal device includes:
 a positional information acquiring unit configured to acquire positional information about the terminal device;
 a positional information transmitting unit configured to transmit the acquired positional information to the server device through the network;
 a map data receiving unit configured to receive the map data from the geographic information transmitting unit of the server device;
 an altitude detecting unit configured to detect an altitude data about a position of the terminal device; and
 a display unit configured to calculate on which story of the structure the terminal device exists based on the story information including the altitude of each story of the structure, the map data received at the map data receiving unit, and the altitude data detected at the altitude detecting unit, and display the calculated story on which the terminal device exists, the map data, and the positional information about the terminal device.

2. The positional information providing system according to claim 1,
wherein
the server device further includes an altitude information transmitting unit configured to transmit an altitude information to the terminal device through the network; and
the terminal device further includes an altitude information receiving unit configured to receive the altitude information transmitted from the server device.

3. The positional information providing system according to claim 2, wherein:
the map data includes shape data of a structure including a building;
the terminal device further includes an altitude data calibrating unit configured to receive the altitude data detected at the altitude detecting unit and the altitude information received at the altitude information receiving unit and calibrate the altitude data at a position of the terminal device; and
when it is determined that the terminal device is located on an outside of the structure based on the shape data of the structure, the altitude calibrating unit of the terminal device calibrates the altitude data at a position of the terminal device.

4. The positional information providing system according to claim 2,
wherein the positional information acquiring unit of the terminal device receives a plurality of types of positional information signals;
the terminal device further includes an altitude data calibrating unit configured to receive the altitude data detected at the altitude detecting unit and the altitude information received at the altitude information receiving unit and calibrate the altitude data at a position of the terminal device; and
when a type of a positional information signal acquired at the positional information acquiring unit is determined and it is determined that the positional information signal is a global positioning system (GPS) signal, the altitude data calibrating unit calibrates the altitude data about a position of the terminal device.

5. The positional information providing system according to claim 2,
wherein the terminal device further includes an altitude data calibrating unit configured to receive the altitude data detected at the altitude detecting unit and the altitude information received at the altitude information receiving unit and calibrate the altitude data at a position of the terminal device; and
the altitude data calibrating unit of the terminal device calibrates altitude data so that the altitude data detected at the altitude detecting unit is matched with the altitude information received at the altitude information receiving unit.

6. The positional information providing system according to claim 1, wherein the altitude detecting unit of the terminal device includes an atmospheric pressure sensor configured to detect altitude data at a position of the terminal device.

7. A terminal device comprising:
a positional information acquiring unit configured to acquire positional information about the terminal device;
a positional information transmitting unit configured to transmit the acquired positional information to a server device through a network;
a map data receiving unit configured to receive map data map data and story information including an altitude of each story of a structure in a position on the map data from the server device;
an altitude detecting unit configured to detect altitude data about a position of the terminal device; and
a display unit configured to calculate on which story of the structure the terminal device exists based on the story information including the altitude of each story of the structure, the map data received at the map data receiving unit, and the altitude data detected at the altitude detecting unit, and display the calculated story on which the terminal device exists, the map data, and the positional information about the terminal device.

8. A navigation system comprising:
a server device, a positional information transmitter, and a terminal device connected to each other through a network, wherein:
the server device includes:
a map data storage unit configured to store map data and story information including an altitude of each story of a structure in a position on the map data;
a positional information receiving unit configured to receive positional information about the terminal device transmitted from the terminal device and positional information about the positional information transmitter transmitted from the positional information transmitter through the network;
a geographic information transmitting unit configured to transmit map data stored on the map data storage unit to the terminal device through the network;
a navigation route searching unit configured to search for a navigation route from the terminal device to the positional information transmitter;
a navigation route information generating unit configured to generate navigation route information based on a result searched at the navigation route searching unit; and
a navigation route information transmitting unit configured to transmit the navigation route information generated at the navigation route information generating unit to the terminal device through the network;
the positional information transmitter
is configured to generate positional information about the positional information transmitter and transmit the positional information to the server device through the network; and
the terminal device includes:
a positional information acquiring unit configured to acquire positional information about the terminal device;
a positional information transmitting unit configured to transmit the acquired positional information about the terminal device to the server device through the network;
a map data receiving unit configured to receive the map data transmitted from the geographic information transmitting unit of the server device;
an altitude detecting unit configured to detect altitude data about a position of the terminal device;
a navigation route information receiving unit configured to receive the navigation route information transmitted from the server device; and
a display unit configured to calculate on which story of the structure the terminal device exists based on the story information including the altitude of each story of the structure, the map data received at the map data receiving unit, the altitude data detected at the altitude detecting unit, the positional information about the terminal device acquired at the positional information acquiring unit, and the navigation route information received at the navigation route information receiving unit, and display the calculated story on which the terminal device exists, the map data, and the positional information about the terminal device.

9. The navigation system according to claim 8, wherein
the server device further includes an altitude information transmitting unit configured to transmit an altitude information to the terminal device through the network; and
the terminal device further includes an altitude information receiving unit configured to receive the altitude information transmitted from the server device.

10. The navigation system according to claim 9, wherein:
the map data includes shape data of a structure including a building;
the terminal device further includes an altitude data calibrating unit configured to receive the altitude data detected at the altitude detecting unit and the altitude information received at the altitude information receiving unit and calibrate the altitude data at a position of the terminal device; and
when it is determined that the terminal device is located on an outside of the structure based on the shape data of the structure, the altitude calibrating unit of the terminal device calibrates the altitude data at a position of the terminal device.

11. The navigation system according to claim 9, wherein:
the positional information acquiring unit of the terminal device receives a plurality of types of positional information signals;
the terminal device further includes an altitude data calibrating unit configured to receive the altitude data detected at the altitude detecting unit and the altitude information received at the altitude information receiving unit and calibrate the altitude data at a position of the terminal device; and
when a type of a positional information signal acquired at the positional information acquiring unit is determined and it is determined that the positional information signal is a global positioning system (GPS) signal, the altitude data calibrating unit calibrates altitude data about a position of the terminal device.

12. The navigation system according to claim 9, wherein the terminal device further including an altitude data calibrating unit configured to receive the altitude data detected at the altitude detecting unit and the altitude information received at the altitude information receiving unit and calibrate the altitude data at a position of the terminal device; and
the altitude data calibrating unit of the terminal device calibrates altitude data so that the altitude data detected at the altitude detecting unit is matched with the altitude information received at the altitude information receiving unit.

13. The navigation system according to claim 8, wherein the altitude detecting unit of the terminal device includes an atmospheric pressure sensor configured to detect altitude data at a position of the terminal device.

14. A terminal device comprising:
a positional information acquiring unit configured to acquire positional information about the terminal device;
a positional information transmitting unit configured to transmit the acquired positional information to a server device through network;
a map data receiving unit configured to receive map data and story information including an altitude of each story of a structure in a position on the map data from the server device;
an altitude detecting unit configured to detect altitude data about a position of the terminal device;
a navigation route information receiving unit configured to receive navigation route information from the terminal device to a positional information transmitter transmitted from the server device; and
a display unit configured to calculate on which story of the structure the terminal device exists based on the story information including the altitude of each story of the structure, the map data received at the map data receiving unit, the altitude data detected at the altitude detecting unit, and the navigation route information received at the navigation route information receiving unit, and display calculated story on which the terminal device exists, the map data, and the positional information about the terminal device.

15. The terminal device according to claim 14, further comprising:
a route navigation unit configured to add an indication to the map data displayed on the display unit, the indication instructing a moving direction.

16. The terminal device according to claim 15, wherein the route navigation unit adds the indication when the terminal device is within a predetermined distance range from the positional information transmitter.

17. The terminal device according to claim 15, wherein the route navigation unit adds an indication that indicates a position of the positional information transmitter and a position in a height direction of the positional information transmitter with respect to the terminal device.

18. A terminal device comprising:
a map data storage unit configured to store map data and story information including an altitude of each story of a structure in a position on the map data;
a positional information acquiring unit configured to acquire positional information about the terminal device and positional information about a positional information transmitter through a network;
an altitude detecting unit configured to detect altitude data about a position of the terminal device;
a navigation route searching unit configured to search for a navigation route from the terminal device to the positional information transmitter based on the information generated at the map and altitude information generating unit;
a navigation route information generating unit configured to generate navigation route information based on a result searched at the navigation route searching unit; and
a display unit configured to calculate on which story of a structure the terminal device exists based on the story information including the altitude of each story of the structure, the map data, and the altitude data detected at the altitude detecting unit and the navigation route information, and display the calculated story on which the terminal device exists, the map data, and the positional information about the terminal device.

* * * * *